(12) United States Patent
Lane et al.

(10) Patent No.: US 10,534,063 B2
(45) Date of Patent: Jan. 14, 2020

(54) ZERO OPTICAL PATH DIFFERENCE PHASED ARRAY FOR DETERMINING A DIRECTION OF AN INCOHERENT OPTICAL SOURCE

(71) Applicant: The Charles Stark Draper Laboratory, Inc., Cambridge, MA (US)

(72) Inventors: Benjamin F. Lane, Sherborn, MA (US); Steven J. Spector, Lexington, MA (US); Juha-Pekka J. Laine, Boston, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 16/360,232

(22) Filed: Mar. 21, 2019

(65) Prior Publication Data

US 2019/0219658 A1    Jul. 18, 2019

Related U.S. Application Data

(62) Division of application No. 15/051,875, filed on Feb. 24, 2016, now Pat. No. 10,274,575.
(Continued)

(51) Int. Cl.
*G01S 3/786* (2006.01)
*G02B 6/28* (2006.01)
(Continued)

(52) U.S. Cl.
CPC .......... *G01S 3/7867* (2013.01); *G02B 6/125* (2013.01); *G02B 6/12009* (2013.01);
(Continued)

(58) Field of Classification Search
CPC ..... G01S 3/7867; G02B 6/125; G02B 6/2861; G02B 6/124; G02B 6/12011;
(Continued)

(56) References Cited

U.S. PATENT DOCUMENTS 4,063,250 A * 12/1977 Fenwick .................. H01Q 3/38
343/844
4,515,430 A    5/1985 Johnson
(Continued)

OTHER PUBLICATIONS

Astrobaki, "Basic Interferometry II," https://casper.berkeley.edu/astrobaki/index.php/Basic_Interferometry_II, 5 pages, Oct. 2012.
(Continued)

*Primary Examiner* — Que Tan Le
*Assistant Examiner* — Jennifer D Bennett
(74) *Attorney, Agent, or Firm* — Sunstein Kann Murphy & Timbers LLP

(57) ABSTRACT

A zero-optical-path-length-difference optical phased array built with essentially planar photonic devices determines a direction to an incoherent optical source, such as a star. The phased array can replace a 3-dimensional star tracker with a nearly 2-dimensional system that is smaller and lighter. The zero-optical-path-length-difference phased array can be optically connected to an interferometer. Driven by a light source, the zero-optical-path-length-difference phased array can be used as an optical projector.

3 Claims, 22 Drawing Sheets

Related U.S. Application Data

(60) Provisional application No. 62/120,459, filed on Feb. 25, 2015.

(51) Int. Cl.
| | | |
|---|---|---|
| *G02B 6/125* | (2006.01) | |
| *G02B 6/35* | (2006.01) | |
| *G02B 6/12* | (2006.01) | |
| *G02B 6/124* | (2006.01) | |

(52) U.S. Cl.
CPC ........ *G02B 6/12011* (2013.01); *G02B 6/2861* (2013.01); *G02B 6/3544* (2013.01); *G02B 6/124* (2013.01)

(58) Field of Classification Search
CPC G02B 6/12009; G02B 6/3544; G01C 21/025; G02F 1/01; G02F 1/218; H01Q 1/24; H01Q 3/24; H01Q 3/247
See application file for complete search history.

(56) References Cited

U.S. PATENT DOCUMENTS

| | | | |
|---|---|---|---|
| 5,061,048 A | 10/1991 | Hayden et al. | |
| 7,729,572 B1 * | 6/2010 | Pepper .............. | G02B 6/12004 342/375 |
| 8,270,067 B1 | 9/2012 | Hsieh et al. | |
| 8,988,754 B2 | 3/2015 | Sun et al. | |
| 2003/0043071 A1 * | 3/2003 | Lilly .................. | H01Q 3/22 342/368 |
| 2004/0156591 A1 | 8/2004 | Zheng et al. | |
| 2007/0229381 A1 | 10/2007 | Piisila et al. | |
| 2010/0225539 A1 | 9/2010 | Margomenos et al. | |
| 2010/0302548 A1 | 12/2010 | Digonnet et al. | |
| 2011/0222814 A1 | 9/2011 | Krill et al. | |
| 2014/0192394 A1 | 7/2014 | Sun et al. | |
| 2014/0267641 A1 | 9/2014 | Laine et al. | |
| 2014/0267755 A1 | 9/2014 | Laine et al. | |
| 2015/0002854 A1 | 1/2015 | Laine et al. | |
| 2015/0226830 A1 | 8/2015 | Laine et al. | |
| 2015/0346340 A1 | 12/2015 | Yaacobi et al. | |

OTHER PUBLICATIONS

Astrobaki, "Basic Interferometry," https://casper.berkeley.edu/astrobaki/index.php/Basic_Interferometry, 3 pages. Nov. 2012.

Bharadwaj, et al., "Optical Antennas," Advances in Optics and Photonics, vol. 1, pp. 438-483, 2009.

Chandran, "A Survey of Clock Distribution Techniques Including Optical and RF Networks," Masters Thesis, Auburn University, 59 pages, Dec. 14, 2013.

Drabowitch, et al., "High resolution imagery and the maximum entropy method," Modern Antennas, ISBN 1475727585, 9781475727586, pp. 561-563, Nov. 2013.

Finger, et al., "Useful Classes of Redundant Arrays for Imaging Applications," Imaging in High Energy Astronomy, Springer Netherlands, 6 pages, 1995.

Friedman, "Clock Distribution Networks in Synchronous Digital Integrated Circuits," Proceedings of the IEEE, vol. 89, No. 5, pp. 665-692, May 2001.

Sun, et al., "Large-scale nanophotonic phased array," Nature, vol. 493, pp. 195-199, Jan. 10, 2013.

Tam, "Modern Clock Distribution Systems," Chapter 2 of T. Xanthopoulos, Clocking in Modern VLSI Systems, Springer Science & Business Media, ISBN 9781441902610, 58 pages, 2009.

Tokovin, "Wave-Front Sensors," http://www.ctio.noao.edu/~atokovin/tutorial/part3/wfs.html, 10 pages, 2001.

Van Dam, "Measuring the centroid gain of a Shack-Hartmann quad-cell wavefront sensor by using slope discrepancy," Journal of the Optical Society of America, vol. 22, issue 8, 25 pages, Auhut 2005.

Wikipedia, "Aperture masking interferometry," https://en.wikipedia.org/w/index.php?title=Aperture_masking_interferometry&oldid=542558651, 3 pages, Mar. 7, 2013.

Wikipedia, "Aperture synthesis," https://en.wikipedia.org/w/index.php?title=Aperture_synthesis&oldid=627989403, 3 pages, Oct. 2, 2014.

Wikipedia, "Coherence (lyrics)," https://en.wikipedia.org/w/index.php?title=Coherence_(physics)&oldid=633267541, 10 pages, Nov. 20, 2014.

Wikipedia, "H tree," https://en.wikipedia.org/wiki/H_tree, 4 pages, Dec. 28, 2014.

Wikipedia, "Very-long-baseline interferometry," https://en.wikipedia.org/w/index.php?title=Very-long-baseline_interferometry&oldid=642876560, 5 pages, Jan. 17, 2015.

International Search Report, International Application No. PCT/US2016/019244, together with the Written Opinion, 18 pages, dated Jan. 25, 2017.

\* cited by examiner

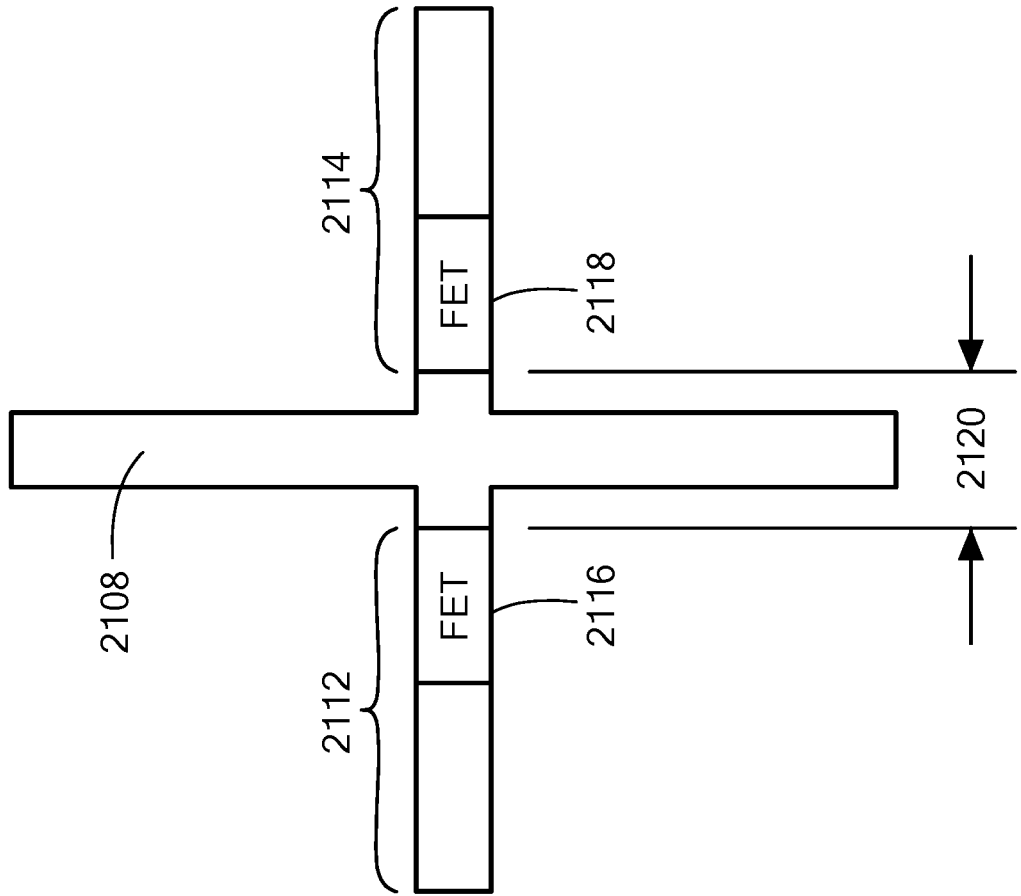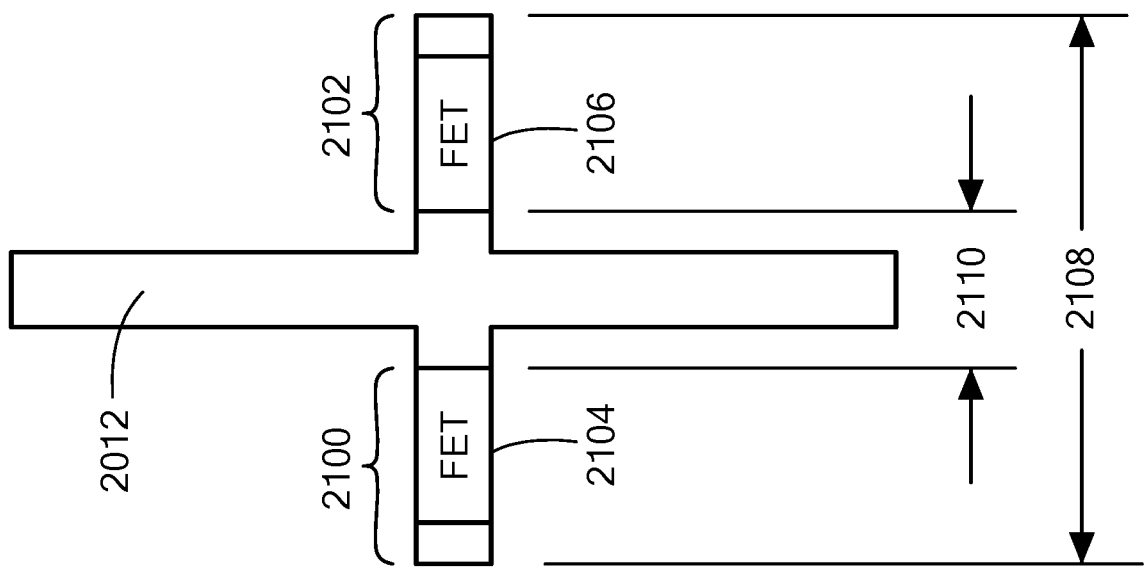
FIG. 21

ZERO OPTICAL PATH DIFFERENCE PHASED ARRAY FOR DETERMINING A DIRECTION OF AN INCOHERENT OPTICAL SOURCE

CROSS REFERENCE TO RELATED APPLICATIONS

This application is a divisional of U.S. patent application Ser. No. 15/051,875, filed Feb. 24, 2016 titled "Zero Optical Path Difference Phased Array," which claims the benefit of U.S. Provisional Patent Application No. 62/120,459, filed Feb. 25, 2015, titled "Zero Optical Path Difference (ZOPD) Phased Array," the entire contents of each of which are hereby incorporated by reference herein, for all purposes.

TECHNICAL FIELD

The present invention relates to interferometers and, more particularly, to interferometers with steerable phased arrays of receptors coupled by optical waveguides to optical detectors.

BACKGROUND ART

Most artificial satellites, spacecraft and other propelled devices, such as aircraft, ship and ground vehicles (collectively referred to herein as vehicles), require information about their locations and/or attitudes to accomplish their missions. This information may be obtained from one or more sources, such as an inertial navigation system (INS), a global positioning system (GPS), ground-based radar tracking stations and/or an on-board star tracker.

A star tracker is an optical device that measures bearing(s) to one or more stars, as viewed from a vehicle. A star tracker typically includes a star catalog that lists bright navigational stars and information about their locations in the sky, sufficient for a processor to calculate a location of a vehicle in space, given bearings to several of the stars. A conventional star tracker includes a lens that projects an image of a star onto a photocell, or that projects an image of one or more stars onto a light-sensitive sensor array (digital camera).

One type of star tracker is "strapped-down," meaning its view angle, relative to its vehicle, is fixed. Another type of star tracker can be aimed mechanically, such as in a direction in which a navigational star is expected to be seen. Using data from the photocell or sensor array, the star catalog and information about the star tracker's view angle, relative to the vehicle, a processor in the star tracker calculates a position of the vehicle in space.

Strapped-down star trackers are mechanically simpler than mechanically aimable star trackers. However, the fixed view angle of a strapped-down star tracker limits the number of navigational stars that may be used. Mechanically aimable start trackers can use a larger number of navigational stars. However, aiming a prior art star tracker, relative to its vehicle, with the required precision poses substantial problems. In either case, preventing stray light, such as from the sun or reflected from the moon, reaching the photocell or sensor array is challenging, particularly when a navigational star of interest is apparently close to one of these very bright objects.

Conventional strapped-down and mechanically aimable star trackers are large, heavy and consume a large amount of energy. For example, a large lens is massive, and its focal length distance between the lens and sensor contribute to the volume occupied by a star tracker. Smaller and lighter star trackers are desirable.

SUMMARY OF EMBODIMENTS

An embodiment of the present invention provides an optical phased array. The optical phased array has a design wavelength. The design wavelength is between about 100 nm and about 1 mm. The optical phased array also has a design bandwidth. The optical phased array includes a wafer. A first plurality of optical couplers is disposed in a predefined array, relative to the wafer. A first optical port is disposed in a predefined location, relative to the wafer.

A first plurality of optical waveguides is disposed relative to the wafer. The first plurality of optical waveguides optically connects the first plurality of optical couplers to the first port via respective first optical paths. There is one first optical path per first optical coupler. Optical lengths of all the first optical paths are equal, within a criterion. The criterion may be one coherence length at a bandwidth greater than about 0.1% plus a spacing between two maximally spaced-apart optical couplers of the first plurality of optical couplers.

The first plurality of optical waveguides may be configured such that the first optical paths include respective incrementally augmented optical paths. The incrementally augmented optical paths bias constructive phase interference in a predetermined direction of wavefront tilt.

The optical lengths of all the first optical paths may be equal, within a predetermined fraction of the design wavelength. The predetermined fraction of the design wavelength may be less than 1. The predetermined fraction of the design wavelength may be about $\frac{1}{10}$.

The optical lengths of all the first optical paths may be equal, within one coherence length at a bandwidth greater than about 0.1%.

The substrate may include a silicon wafer.

All the optical couplers of the first plurality of optical couplers may be coplanar.

The first plurality of optical waveguides may form a predefined first tree. The first tree may extend from the first plurality of optical couplers to the first port. The first tree may be an H-tree or an X-tree.

Each optical waveguide of the first plurality of optical waveguides may be defined by a respective bore within a thickness of the substrate.

Each optical waveguide of the first plurality of optical waveguides may include a respective solid optical medium disposed within a thickness of the substrate.

An optical phased array as defined by claim 1, wherein each optical waveguide of the first plurality of optical waveguides is disposed on a surface of the wafer.

The optical phased array may also include a first plurality of dynamically tunable optical delay lines. Each dynamically tunable optical delay line of the plurality of dynamically tunable optical delay lines may be disposed in a respective optical path of the first optical paths.

Each dynamically tunable optical delay line of the plurality of dynamically tunable optical delay lines may include a thermally phase-tunable optical delay line.

The optical phased array may also include a second plurality of optical couplers disposed in a predefined array, relative to the wafer. A second optical port may be disposed in a predefined location, relative to the wafer. A second plurality of optical waveguides may be disposed relative to the wafer. The second plurality of optical waveguides may optically connect the second plurality of optical couplers to the second port via respective second optical paths. There may be one second optical path per second optical coupler. Optical lengths of all the first and second optical paths may be equal, within a criterion. The criterion may be one coherence length at a bandwidth greater than about 0.1% plus a spacing between two maximally spaced-apart optical couplers of the second plurality of optical couplers.

The optical phased array may also include a third plurality of optical couplers disposed in a predefined array, relative to the wafer. A third optical port may be disposed in a predefined location, relative to the wafer. A third plurality of optical waveguides may be disposed relative to the wafer. The third plurality of optical waveguides may optically connect the third plurality of optical couplers to the third port via respective third optical paths. There may be one third optical path per third optical coupler. Optical lengths of all the first, second and third optical paths are equal, within a criterion. The criterion may be one coherence length at a bandwidth greater than about 0.1% plus a spacing between two maximally spaced-apart optical couplers of the third plurality of optical couplers.

The optical phased array may also include a plurality of optical transducers disposed in a predefined array of optical transducers. The first, second and third optical ports may be disposed in a predefined array, relative to the array of optical transducers. The first, second and third optical ports may be optically connected to the array of optical transducers via a common optical propagation region.

The plurality of optical transducers may include a plurality of optical sensors. The optical phased array may also include a processor. The processor may be connected to the plurality of optical sensors to receive signals from the plurality of optical sensors. The signals may be indicative of intensity of light received by the plurality of optical sensors. The processor may execute processes that analyze the signals to calculate an axis of propagation of incoherent light from a far field of the optical phased array. The axis may be relative to the wafer.

The first, second and third optical ports may be spaced apart according to a non-redundant arrangement.

The first, second and third optical ports may be disposed on a surface of the wafer.

The optical phased array may also include a plurality of microlenses. Each microlens of the plurality of microlenses may be disposed proximate a respective optical coupler of one of the first, second and third pluralities of optical couplers.

The first, second and third pluralities of optical waveguides may be disposed in a first layer of the wafer. The common optical propagation region may be disposed in a second layer of the wafer. The second layer of the wafer may be parallel to, and spaced apart from, the first layer. The common optical propagation region may thus be optically folded under the first, second and third pluralities of optical waveguides.

The optical phased array may also include an electrically controllable optical beam steerer. The electrically controllable optical beam steerer may be disposed optically on another side of the first plurality of optical couplers from the first plurality of optical waveguides.

The optical beam steerer may include a plurality of layers. Each layer of the optical beam steerer may have a respective first refractive index and a respective second refractive index. Each layer's second refractive index may be different from the layer's first refractive index at the design wavelength. Each layer's second refractive index may be different from each other layer's second refractive index at the design wavelength. Each layer of the optical beam steerer may be independently electrically switchable between the layer's first refractive index and the layer's second refractive index.

Each layer of the optical beam steerer may include a plurality of nanoantennas. Each nanoantenna may include an electrically conductive antenna element. The antenna element may have two antenna sub-elements. The two antenna sub-elements may be electrically connected to each other via an electronic switch. The switch may have a first mode and a second mode. In the first mode, electrical lengths of all the antenna elements of a given layer are equal. However, in the second mode, the electrical lengths of the antenna elements of the given layer monotonically increase along a thickness of the given layer.

Electrical lengths of the sub-elements of a given layer may monotonically increase along a thickness of the given layer. In the first mode, the two sub-elements of each element are electrically isolated from each other. Therefore, in the first mode, electrical lengths of all the antenna elements of a given layer are equal. However, in the second mode, the two sub-elements of each element are electrically connected to each other. Therefore, in the second mode, the electrical lengths of the antenna elements of the given layer monotonically increase along a thickness of the given layer.

The optical phased array may also include an incoherent light source. The incoherent light source may be optically coupled to the first optical port. The optical phased array may also include a first plurality of dynamically tunable optical delay lines. Each dynamically tunable optical delay line of the first plurality of dynamically tunable optical delay lines may be disposed in a respective optical path of the first optical paths. A processor may be connected to the incoherent light source and to the first plurality of dynamically tunable optical delay lines. The processor may control output of the incoherent light source. The processor may control a respective amount of delay introduced by each dynamically tunable optical delay line of the first plurality of dynamically tunable optical delay lines. Thus, the processor may control a radiation pattern, relative to the wafer, of propagation of incoherent light from the first plurality of optical couplers into a far field of the optical phased array.

Another embodiment of the present invention provides a method for ascertaining a direction to an incoherent optical source. According to the method, light is received from the incoherent optical source by a first plurality of optical couplers. The light received by the first plurality of optical couplers is guided along a first plurality of optical paths through a first plurality of optical waveguides to a first optical port. There may be one optical path per optical coupler. Optical lengths of all the first plurality of optical paths are equal, within a criterion. The criterion may be one coherence length at a bandwidth greater than about 0.1% plus a spacing between two maximally spaced-apart optical couplers of the first plurality of optical couplers. The light is emitted by the first optical port toward an optical sensor. A first plurality of dynamically tunable optical delay lines is automatically adjusted. Each dynamically tunable optical delay line of the first plurality of dynamically tunable optical delay lines is disposed in a respective optical path of the first plurality of optical paths. Automatically adjusting the first plurality of dynamically tunable optical delay lines steers sensitivity of the first plurality optical couplers to the light. Intensity of the light is sensed by the first optical sensor, in relation to the steering. The direction to the incoherent optical source is automatically calculated, based on the intensity of the light and the steering.

Optionally, light from the incoherent optical source may be received by second and third pluralities of optical couplers. The light received by the second and third pluralities of optical couplers may be guided along respective second and third pluralities of optical paths. The second and third pluralities of optical paths may extend through respective second and third pluralities of optical waveguides to respective second and third optical ports. There may be one optical path per optical coupler. Optical lengths of all the first, second and third pluralities of optical paths may be equal, within a criterion. The criterion may be one coherence length at a bandwidth greater than about 0.1% plus a spacing between two maximally spaced-apart optical couplers of the first, second and third plurality of optical couplers. The light may be emitted by the second and third optical ports. The light may be emitted toward the optical sensor. Emitting the light by the first, second and third optical ports may include emitting the light into a common optical propagation region. The optical sensor may include an array of optical sensors. Second and third pluralities of dynamically tunable optical delay lines may be automatically adjusted. Each dynamically tunable optical delay line of the second and third pluralities of dynamically tunable optical delay lines may be disposed in a respective plurality of optical paths. Automatically adjusting the second and third pluralities of dynamically tunable optical delay lines may, therefore, steer sensitivities of the second and third pluralities of optical couplers to the light. The light from the first, second and third optical ports may be propagated through the common optical propagation region to the array of optical sensors. Respective intensities of the light may be sensed by the array of optical sensors. The intensities of the light may be sensed in relation to the respective steerings. The direction to the incoherent optical source may include automatically calculating the direction to the incoherent optical source, based on the respective intensities of the light and the respective steerings.

Optionally, prior to the light impinging on the first, second and third pluralities of optical couplers, the light from the incoherent optical source may be steered by an optical beam steerer. The optical beam steerer may include a plurality of layers. Each layer of the optical beam steerer may have, in a first mode, a respective first refractive index and, in a second mode, a respective second refractive index. Each layers' second refractive index may be different from the layer's first refractive index at a design wavelength. Each layer's second refractive index may be different from each other layer's second refractive index at the design wavelength. Each layer of the optical beam steerer may be independently electrically switchable between the layer's first refractive index and the layer's second refractive index. Automatically calculating the direction to the incoherent optical source may include automatically calculating the direction to the incoherent optical source, based on the respective intensities of the light, the respective steerings and respective modes of the layers.

BRIEF DESCRIPTION OF THE DRAWINGS

The invention will be more fully understood by referring to the following Detailed Description of Specific Embodiments in conjunction with the Drawings, of which:

FIG. 21 is a schematic diagram illustrating two of the switchable optical nanoantennas of FIG. 20 in more detail, according to an embodiment of the present invention.

DETAILED DESCRIPTION OF SPECIFIC EMBODIMENTS

Figure 1:
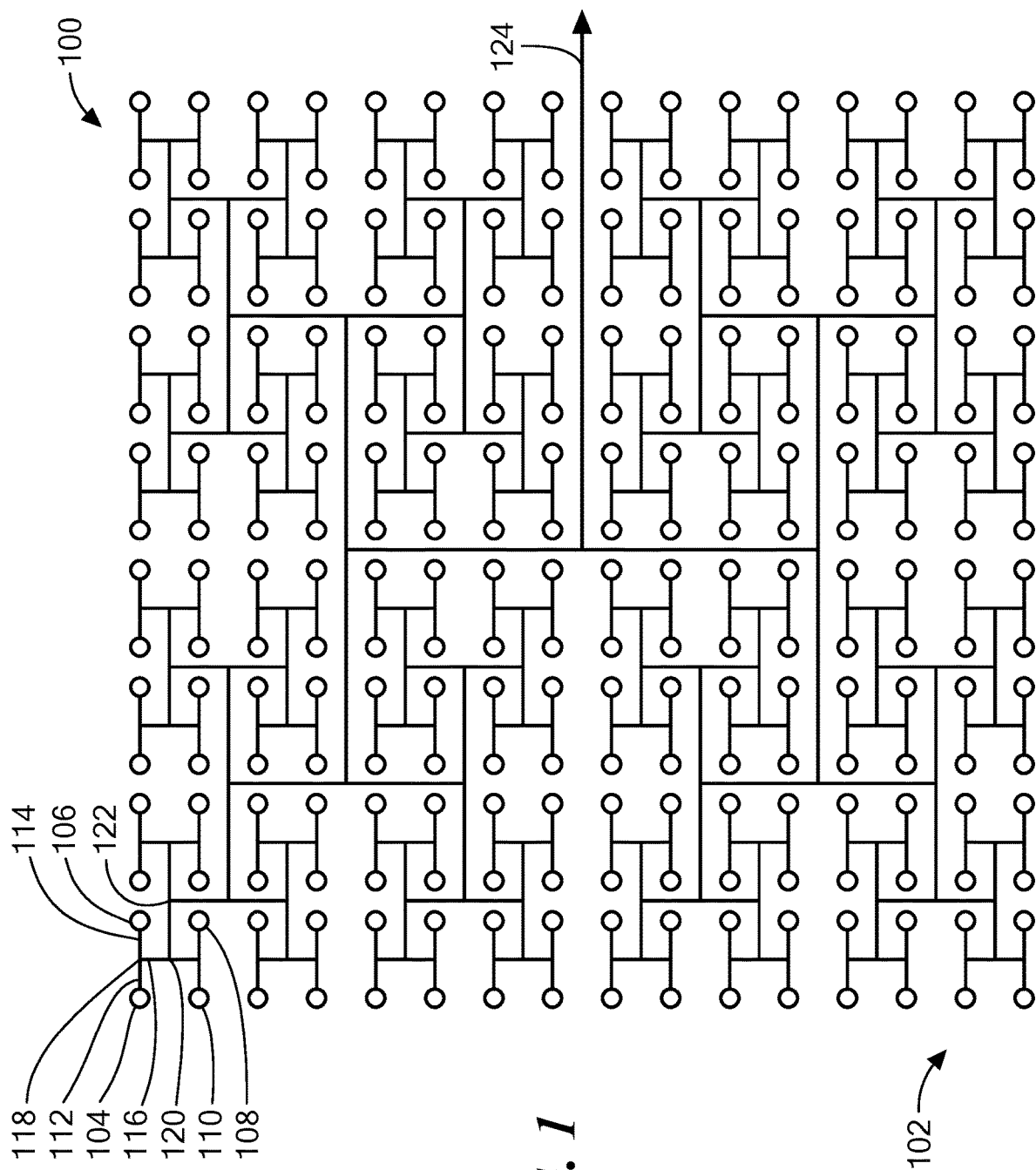
FIG. 1 is a schematic diagram plan view of a phased array of optical couplers, arranged in an H-tree, according to an embodiment of the present invention.

In accordance with embodiments of the present invention, methods and apparatus are disclosed for determining a direction to an incoherent optical source, such as a star, with a novel zero-optical-path-length-difference optical phased array built with essentially planar photonic devices. Such a phased array can replace a 3-dimensional star tracker with a nearly 2-dimensional system that is smaller and lighter. In some embodiments, the zero-optical-path-length-difference phased array is optically connected to an interferometer. In some embodiments, the zero-optical-path-length-difference phased array is driven in reverse, by a light source, and used as a transmitting device.

Phased Arrays of Antennas

Phased arrays of antennas are commonly used in radar and other applications in which a direction of an incoming radio frequency (RF) signal needs to be ascertained or in which an RF signal needs to be transmitted in a particular direction. One or more receivers, transmitters or transceivers are electrically connected to an array of antennas via feed lines, such as waveguides or coaxial cables. Taking a transmitter case as an example, the transmitter(s) operate such that the phase of the signal at each antenna is separately controlled. Signals radiated by the various antennas constructively and destructively interfere with each other in the space in front of the antenna array. In directions where the signals constructively interfere, the signals are reinforced, whereas in directions where the signals destructively interfere, the signals are suppressed, thereby creating an effective radiation pattern of the entire array that favors a desired direction. The phases at the various antennas, and therefore the direction in which the signal propagates, can be changed very quickly, thereby enabling such a system to be electronically steered, for example to sweep over a range of directions.

According to the reciprocity theorem, a phased array of antennas can be used to receive signals preferentially from a desired direction. By electronically changing the phasing, a system can sweep over a range of directions to ascertain a direction from which a signal originates, i.e., a direction from which the signal's strength is maximum.

Sun, Watts, et al., (hereinafter "Watts") describe a phased array of optical antennas. (See U.S. Pat. No. 8,988,754 and Sun, Watts, et al., "Large-scale nanophotonic phased array," Nature, Vol. 493, pp. 195-199, Jan. 10, 2013, the entire contents of each of which are hereby incorporated by reference herein for all that it discloses.) Each optical antenna emits light of a specific amplitude and phase to form a desired far-field radiation pattern through interference of these emissions.

However, in any prior art phased array, coherent signals (RF or light) are required, because transmission lines to the antennas are many wavelengths long and they are not all of equal electrical or optical lengths. For example, Watts uses a laser light source and, as can be seen in his FIG. 1, some of his transmission lines are many wavelengths longer than other of his transmission lines. It is assumed that all the optical paths from Watts' laser to his optical antennas have approximately equal optical lengths, modulo the wavelength of the laser light. "Modulo" means a remainder after a number has been divided by a divisor. In this case, the optical length of an optical path is divided by the wavelength of the light. The modulo is a fraction of a wavelength after the optical path length has been divided by an integral multiple of the wavelength.

Watts controls emitting phase of each optical antenna to achieve the desired far-field radiation pattern. However, the light source must be coherent. The wavelength and/or phase of incoherent light vary randomly over time. Therefore, by the time light from an incoherent source traveling along an optically long (many wavelengths) transmission line arrives at its optical antenna (first antenna), the wavelength and/or phase of the source has changed. Thus, light from the source that travels along a much shorter transmission line very likely arrives at its optical antenna out of phase with the light at the first antenna and cannot, therefore, form the desired far-field radiation pattern through interference.

The wavelength and phase of coherent light does not vary over time. Thus, in order for coherent light traveling along optically long and optically short transmission lines to arrive at Watts' respective optical antennas in phase, the transmission lines need only have equal optical lengths, modulo the wavelength of the laser light.

However, star light is incoherent. Therefore, prior art phased arrays cannot be used with star light. Embodiments of the present invention overcome this limitation and enable use of phased arrays with incoherent light. Because teachings related to prior art RF or optical phased arrays are limited to coherent light and are inapplicable to incoherent light, the present application is novel and not obvious over these references.

Zero-Optical-Path-Length-Difference Phased Array

Embodiments of the present invention include zero-optical-path-length-difference phased arrays, meaning all optical paths, between optical antennas or the like on the one hand and points where two or more optical signals combine or are sensed or generated on the other hand, are of equal optical length, within one coherence length at a bandwidth greater than about 0.1%. "Coherence length" means $\lambda^2/\Delta\lambda$, where $\lambda$ is wavelength of light impinging on, or emitted by, the phased array, or a design wavelength of the phased array, and $\Delta\lambda$ means bandwidth of the light or a design bandwidth of the phased array. Some embodiments relax the equality-of-optical-path-lengths requirement by the spacing between maximally spaced-apart optical couplers, to essentially tilt the boresight of the phased array, as described herein. Some embodiments tighten the equality-of-optical-path-lengths requirement to a predetermined fraction, less than 1, of the design wavelength.

Embodiments of the present invention are suitable for optical wavelengths between about 100 nm and about 1 mm. "Optical path length" (OPL), "optical distance" and "optical length" means a product (OPL=ln) of geometric length (l) of a path light follows through a medium and index of refraction (n) of the medium through which the light propagates. The index of refraction of a material is a measure of how much faster light propagates through a vacuum than it does through the material. The index of refraction (n=c/v) is determined by dividing the speed of light (c) in a vacuum by the speed of light (v) in the material.

As used herein, "optical coupler" means an optical antenna or other interface device between optical signals traveling in free space and optical signals traveling in a waveguide, such as an optical fiber or solid glass. In embodiments where optical waveguides extend perpendicular to a desired direction of free-space propagation, an optical coupler should facilitate this change of direction. Examples of optical couplers include compact gratings, prisms fabricated in waveguides and facets etched in wafers and used as mirrors. An "optical antenna" is a device designed to efficiently convert free-propagating optical radiation to localized energy, and vice versa. Optical antennas are described by Palash Bharadwaj, et al., "Optical Antennas," Advances in Optics and Photonics 1.3 (2009), pp. 438-483, the entire contents of which are hereby incorporated by reference herein for all that it discloses.

FIG. 1 is a schematic diagram plan view of a phased array 100 of optical couplers, represented by circles, arranged in an H-tree 102, according to an embodiment of the present invention. The optical couplers, exemplified by optical couplers 104, 106, 108 and 110, are connected to leaves of the H-tree 102. Lines in the H-tree, exemplified by lines 112, 114 and 116, represent optical waveguides or other optical feedlines. The optical waveguides 112-116 meet at optical splitters/combiners, represented by junctions 118, 120 and 122 of the lines 112-116. For example, the optical waveguides 112 and 114 connecting optical couplers 104 and 106 meet at an optical splitter/combiner 118.

The optical waveguides 112 and 114 are of equal lengths. Similarly, other pairs of optical waveguides 112-116 that meet at common junctions are of equal lengths. The direction of combination alternates (left-right, up-down) between successive optical splitters/combiners 118-122 to ensure each signal combination occurs in phase. The resulting phased array 100 operates over a broad range of wavelengths. The entire phased array 100 is fed by an optical waveguide 124, which is referred to herein as a "root" of the H-tree.

Figure 24:
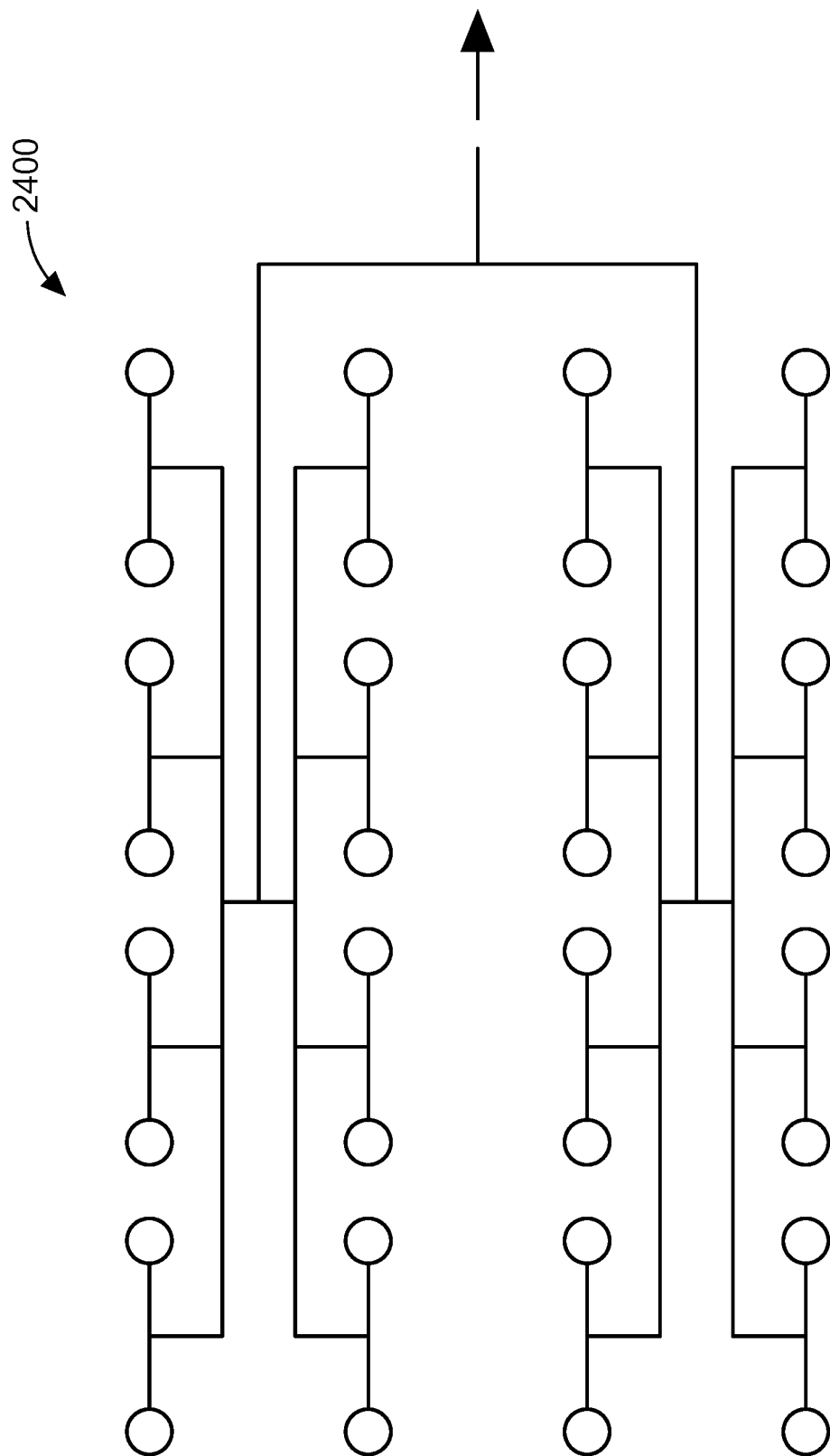
FIG. 24 is a schematic diagram plan view of a phased array of optical couplers, according to another embodiment of the present invention.

Other arrangements of optical couplers are anticipated. For example, FIG. 24 is a schematic diagram plan view of a phased array 2400 of optical couplers according to a different arrangement. The phased array 2400 provides an asymmetric effective field of view. Yet other arrangements of optical couplers are also anticipated. For example, X-trees may be used, although X-trees may require crossing optical paths. However, for simplicity, embodiments of the present invention are described herein using H-trees.

In some embodiments, the optical couplers 104-110 are sized and spaced apart by less than one wavelength, at wavelengths of interest. However, in other embodiments, the optical couplers 104-110 may be spaced apart by more than one wavelength, including tens or hundreds of wavelengths. An embodiment includes a phased array of 32×32 optical couplers with 100 μm spacing. Where spaces between adjacent optical couplers 104-110 are on the order of the sizes of the optical couplers 104-110 or larger, microlenses may be used, as described herein. "Maximally spaced-apart optical couplers" herein means two of the optical couplers 104-110, on a single wafer, that are geometrically spaced apart "as the crow flies," as indicated at 126, a distance, measured in optical length, such that no two other of the optical couplers 104-110 on the same wafer are spaced apart a greater geometric distance, as the crow flies, measured in optical length.

In some embodiments, the phased array 100 is implemented on a photonic chip, such as a silicon wafer. "Wafer" means a manufactured substrate, such as a silicon wafer. The surface of the earth, for example, does not fall within the meaning of wafer. The photonic chip provides a substrate, and the photonic chip may be fabricated to provide the optical waveguides 112-116 within a thickness of the substrate. The optical waveguides 112-116 may be made of glass or another material that is optically transparent at wavelengths of interest. The optical waveguides 112-116 may be solid or they may be hollow, such as a hollow defined by a bore in the thickness of the substrate 200, and partially evacuated or filled with gas, such as air or dry nitrogen. The optical waveguides 112-116 may be defined by a difference between a refractive index of the optical medium of the waveguides and a refractive index of the substrate or other material surrounding the optical waveguides 112-116. The photonic chip may be fabricated using conventional semiconductor fabrication processes, such as the conventional CMOS process.

Figure 2:
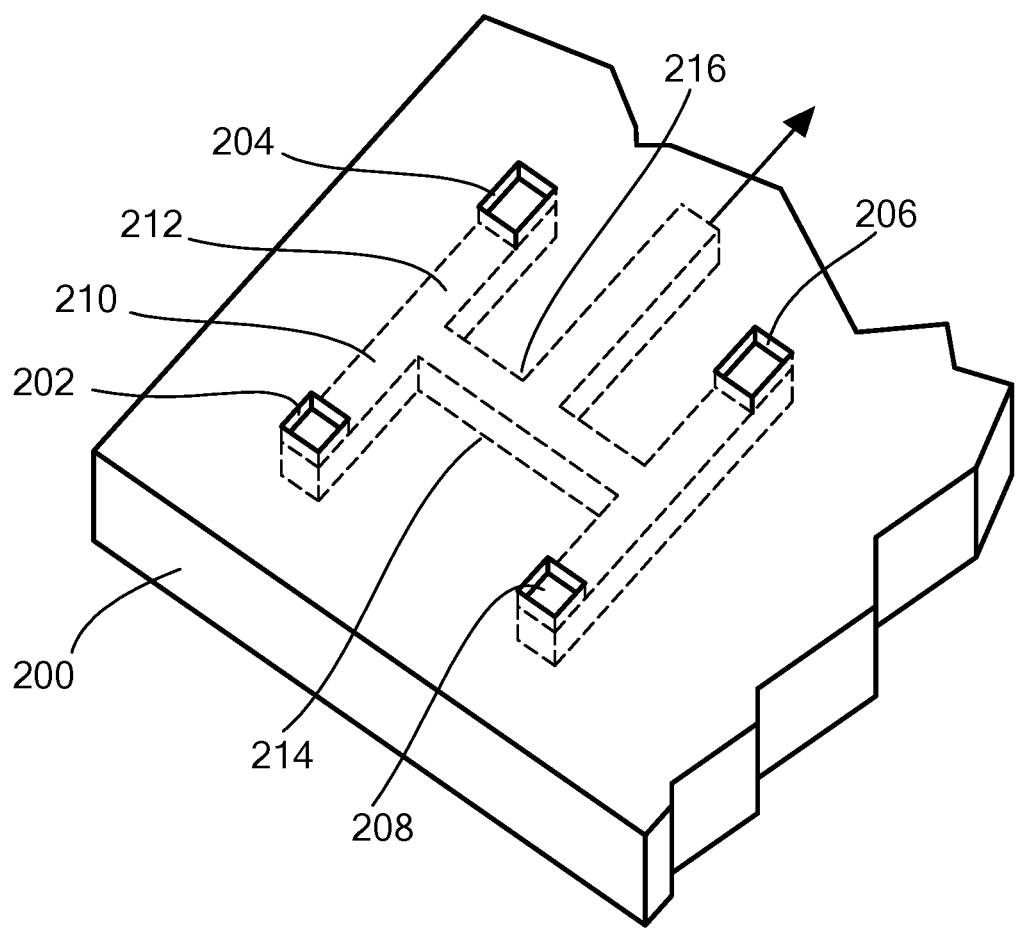
FIG. 2 is a schematic perspective illustration of a portion of a substrate embodying the phased array of optical couplers of FIG. 1, according to an embodiment of the present invention.
Figure 3:
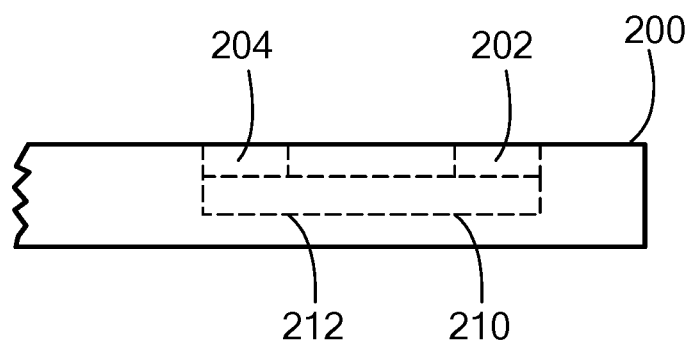
FIG. 3 is a schematic side illustration of the portion of the substrate of FIG. 2.

FIG. 2 is a schematic perspective illustration of a portion of such a substrate 200. FIG. 2 shows four optical couplers 202, 204, 206 and 208, which correspond to the optical couplers 104-108 in FIG. 1. The optical couplers 104-108 are arranged in in an array, relative to the substrate 200. In the embodiment shown in FIG. 2, the optical couplers 104-108 are coplanar. FIG. 2 also shows optical waveguides 210, 212 and 214, which correspond to the optical waveguides 112-116 in FIG. 1. An optical combiner/splitter 216 in FIG. 2 corresponds to the optical combiner/splitter 120 in FIG. 1. FIG. 3 is a schematic side illustration of the portion of the substrate 200.

Design of the optical combiners/splitters, such as optical combiner/splitter 216, should be selected for low loss and coherent power combination. For example, hybrid-ring combiners may be used in appropriate situations, although hybrid-ring combiners are relatively narrow-band devices. Although not shown in FIGS. 2 and 3, the optical waveguide 124 (FIG. 1) may terminate at a side of the substrate 200.

Figure 4:
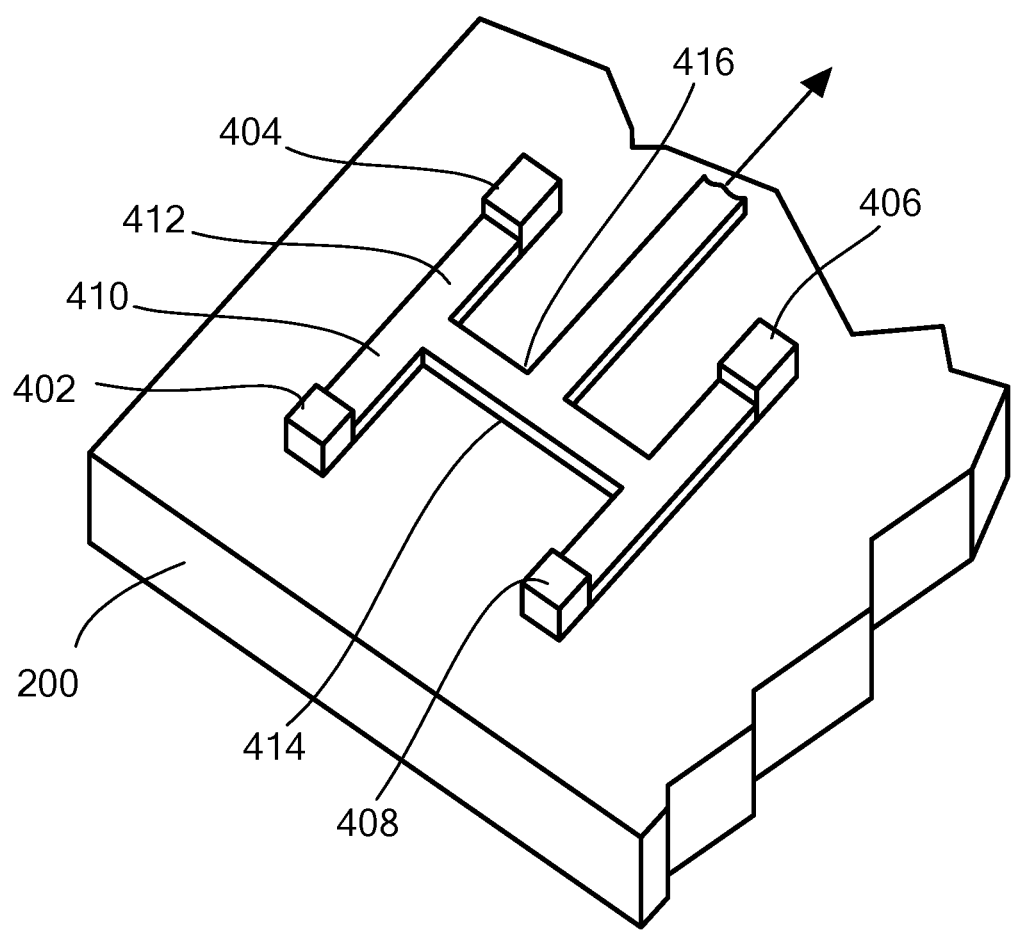
FIG. 4 is a schematic perspective illustration of a portion of a substrate embodying the phased array of optical couplers of FIG. 1, according to another embodiment of the present invention.

FIG. 4 is a schematic perspective illustration of a portion of the substrate 200, according to another embodiment. In this embodiment, optical couplers 402-408, optical waveguides 410-414 and optical combiner/splitter 416 are fabricated on a surface of the substrate 200. Although not shown in FIG. 4, the optical waveguide 124 (FIG. 1) may terminate at an edge of the substrate 200. In yet another embodiment, the waveguides may be free-standing glass or other solid optical medium waveguides surrounded by air and suspended at their respective ends.

Regardless whether the waveguides 210-214 or 410-414 are disposed within the thickness of the substrate 200, on the surface of the substrate 200 or suspended in air, in some embodiments, the arrays of optical couplers 202-208 or 402-408 may be relatively large, in terms of numbers of optical couplers. Some embodiments include arrays of about 10,000 by 10,000 optical couplers, however larger and smaller arrays are contemplated. The H-tree 102 (FIG. 1) layout of the waveguides enables the waveguides 210-214 or 410-414 to occupy a single layer of the substrate 200, thereby avoiding crossing each other. However, if necessary, suitably designed waveguides can cross with much less than 1 db of loss per crossing.

In some embodiments, the substrate 200 is relatively small, such as about 10 cm by about 10 cm, and lengths of the optical waveguides 210-214 or 410-414 vary from about 10 μm to about 5 cm, depending on location of the waveguide within the H-tree. Thus, some of the optical waveguides 210-214 or 410-414 may be less than one wavelength long, and other of the optical waveguides 210-214 or 410-414 may be much longer than one wavelength. However, as noted, the optical lengths of all light paths, from the terminus of the optical waveguide 124 (FIG. 1) to each optical coupler 104-110 or 402-408, are equal, within some predefined criterion, such as within one coherence length or within a predetermined fraction, less than 1, of the design wavelength. In some embodiments, the predetermined fraction is about 1/10.

As initially fabricated, pairs of waveguides that are combined, such as waveguides 210 and 212 or 410 and 412, may not have equal optical lengths, within the desired criterion, such as due to fabrication non-idealities. Some embodiments of the present invention include a trimming portion in each or some of the optical waveguides 210 and 212 or 410 and 412. The optical length of these trimming portions may be adjusted as part of a fabrication process, or thereafter, to equalize the optical lengths of the pairs of optical waveguides, such as 210 and 212 or 410 and 412, to within the desired tolerance.

Figure 5:
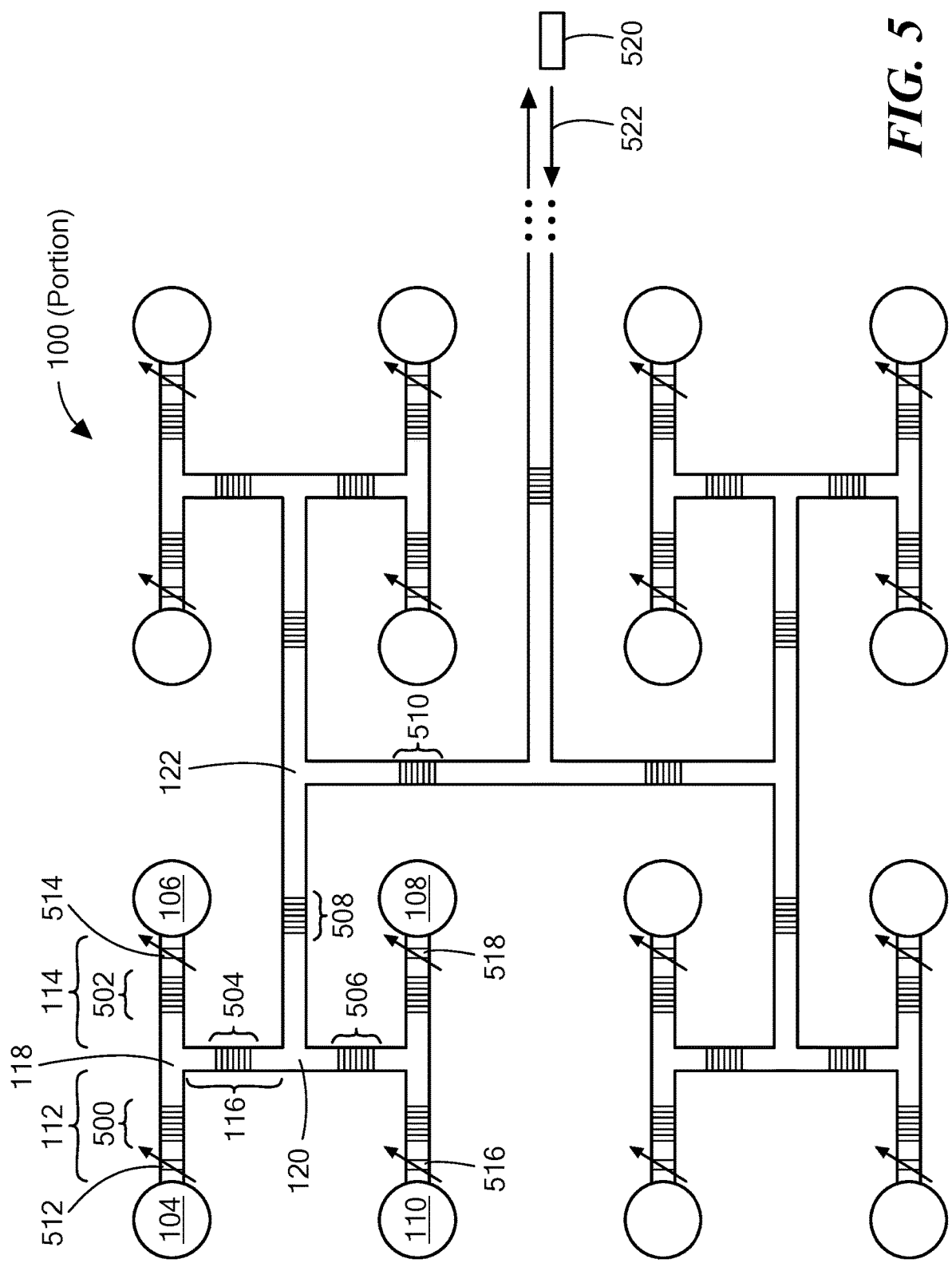
FIG. 5 is a schematic diagram plan view of a portion of the phased array of FIGS. 1-4 showing trimming portions and dynamically tunable optical delay lines, according to an embodiment of the present invention.

FIG. 5 is a schematic diagram plan view of a portion of the phased array 100. The optical waveguides 112, 114 and 116 include respective exemplary trimming portions 500, 502 and 504. The trimming portions 500 and 502 are disposed in the light paths of optical couplers 104 and 106 closer to the optical couplers 104 and 106 than any optical combiners/splitters 118 or 120. Additional trimming portions, such as trimming portions 504, 506, 508 and 510, may be disposed in other optical waveguides, further from the optical couplers 104 and 106.

Figure 6:
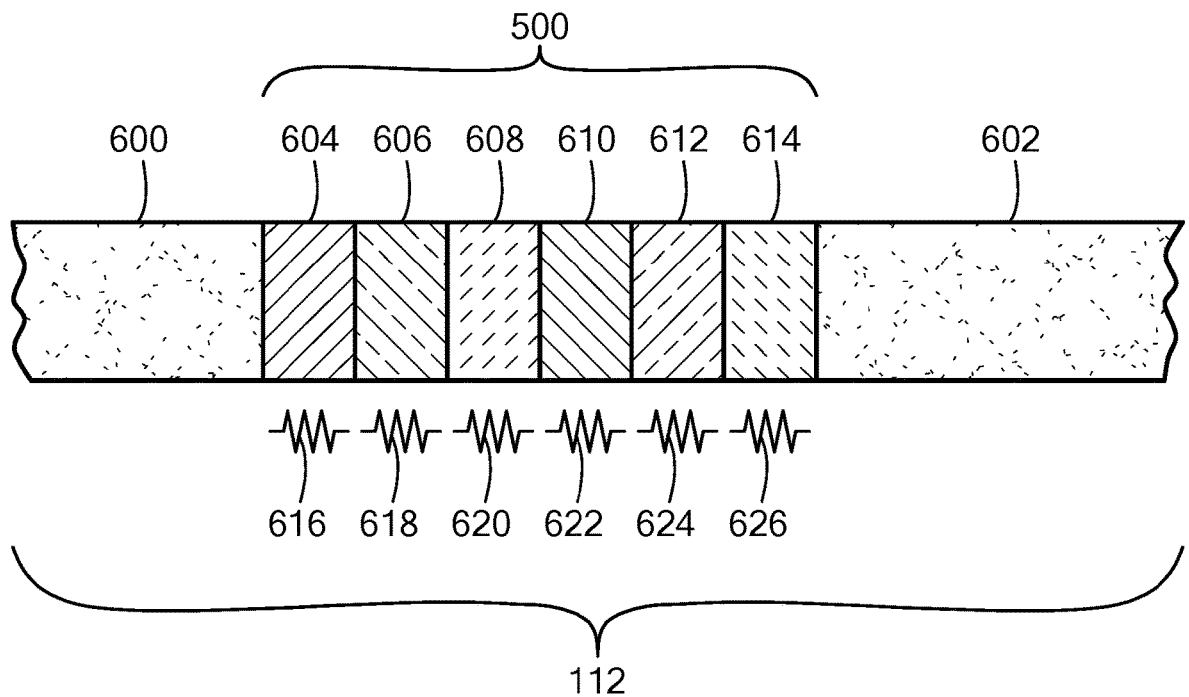
FIG. 6 is a schematic diagram of a portion of one of the optical waveguides of FIG. 5, including the trimming portion, according to an embodiment of the present invention.

FIG. 6 is a schematic diagram of a portion of the optical waveguide 112 showing the trimming portion 500. As noted, in some embodiments the optical waveguides 112-116 are made of glass, which is indicated by reference numerals 600 and 602. The trimming portion 500 includes six trimming sections 604, 606, 608, 610, 612 and 614; however, in other embodiments other numbers of trimming sections may be included. The trimming sections 604-614 may be made of the same material as the glass portions 600 and 602, or the trimming sections 604-614 may be made of a different material. All the trimming sections 604-614 may be made of the same material, or each trimming section 604-614 may be made of a different material. However, each trimming section 604-614 should be made of a material whose refractive index can be permanently changed, such as by annealing the material in the trimming section.

During fabrication or thereafter, optical lengths, or differences thereof, of the optical waveguides 112-116 may be measured, such as by introducing a light beam into the root 124 (FIG. 1) of the H-tree and observing or measuring phase differences at pairs of the optical couplers 104-110. The refractive index of one or more of the trimming sections 604-614 may be permanently changed, such as by annealing, so as to equalize the optical lengths of the optical paths to the optical couplers 104-110. The material in the trimming sections 604-614 may be annealed by heating the material by an external laser or by activating a selected local heater 616, 618, 620, 622, 624 and/or 626 fabricated in the substrate 200. The degree to which a trimming section 604-614 is annealed or otherwise permanently changed may be controlled to select an amount by which the trimming section's refractive index is permanently changed. "Permanently" means the change persists after the process for affecting the change has ended. For example, annealing by heating permanently changes the refractive index of glass, because the change persists after the glass cools to its pre-annealed temperature. A change in a value that reverts to a pre-change value after the process ends is not permanent.

Note that a change made to the refractive index of a trimming portion, such as trimming portion 504, 508 or 510, that is in an optical path common to two or more optical couplers 104-110 affects the optical lengths of all the optical paths to those optical couplers. Thus, gross adjustments to the optical lengths of the optical paths leading to a group of optical couplers 104-110 may be made at trimming portions, for example trimming portions 508-510, that are distant from the optical couplers 104-110, and fine adjustments may be made at trimming portions, for example trimming portions 500-506, that are closer to the optical couplers 104-110.

Figure 7:
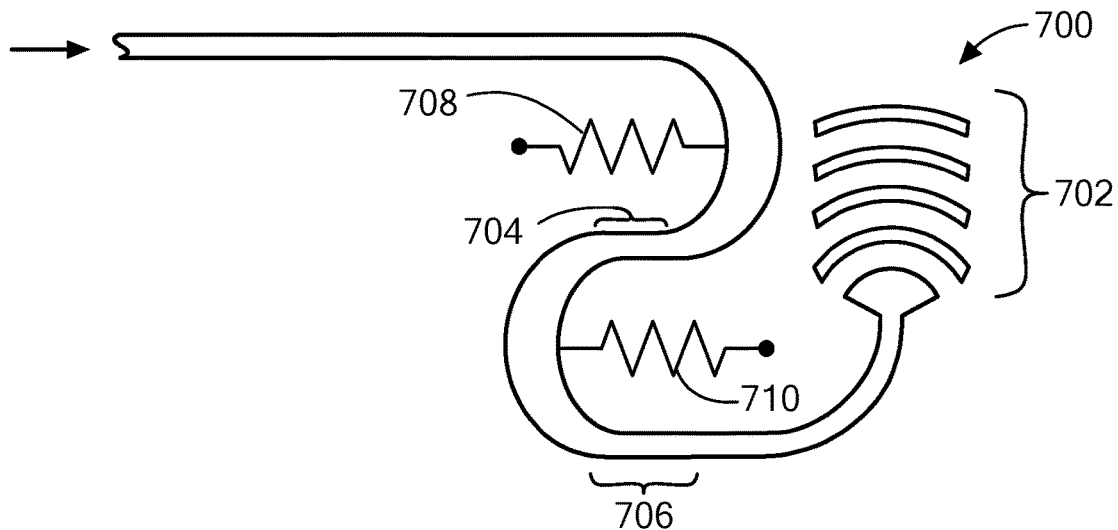
FIG. 7 is a schematic diagram plan view of a dynamically tunable optical delay line of FIG. 5, according to an embodiment of the present invention.

Returning to FIG. 5, the phased array 100 also includes a dynamically tunable optical delay line for each optical coupler 104-110, as exemplified by dynamically tunable optical delay lines 512, 514, 516 and 518. Each dynamically tunable optical delay line is disposed in a respective optical path of the corresponding optical coupler 104-110. FIG. 7 is a schematic diagram plan view of a dynamically tunable optical delay line 700 feeding a compact grating 702 optical coupler. Lengths of two sections 704 and 706 of the dynamically tunable optical delay line 700 may be temporarily adjusted by varying amounts of heat generated by two heaters 708 and 710 that are fabricated in the substrate 200. The amount of heat generated by each heater 708-710 may be controlled by a processor (not shown) executing instructions stored in a memory to perform processes that steer the phased array 100. Thus, each dynamically tunable optical delay line includes a thermally phase-tunable optical delay line. "Temporarily" mean not permanent. For example, after the heaters 708 and 710 cease generating heat, the two sections 704 and 706 of the dynamically tunable optical delay line 700 return to their respective earlier lengths, or at least nearly so.

Dynamically tuning the tunable optical delay lines 512-518 controls the real-time phase of each optical coupler 104-110 or 402-408 of the phased array 100. Dynamically tuning the tunable optical delay lines 512-518 makes temporary changes to the amount of delay incurred by optical signals traversing the corresponding optical coupler 104-110 or 402-408. The amount of delay can be changed relatively quickly, thus the dynamically tunable optical delay lines 512-518 may be dynamically tuned to electronically steer the phased array 100. Instead of, or in addition to, making permanent changes to the trimming sections 604-614, the trimming sections 604-614 and/or the tunable optical delay lines 512-518 may be temporarily changed to compensate for fabrication non-idealities.

As noted, the optical waveguide 124 (FIG. 1) may terminate at a side or edge of the substrate 200. The phased array 100 may be optically connected to a transducer, such as an optical emitter or an optical sensor, or some other optical apparatus via the terminus of the optical waveguide 124.

"Tilted" Zero-Optical-Path-Length-Difference Phased Array

Figure 25:
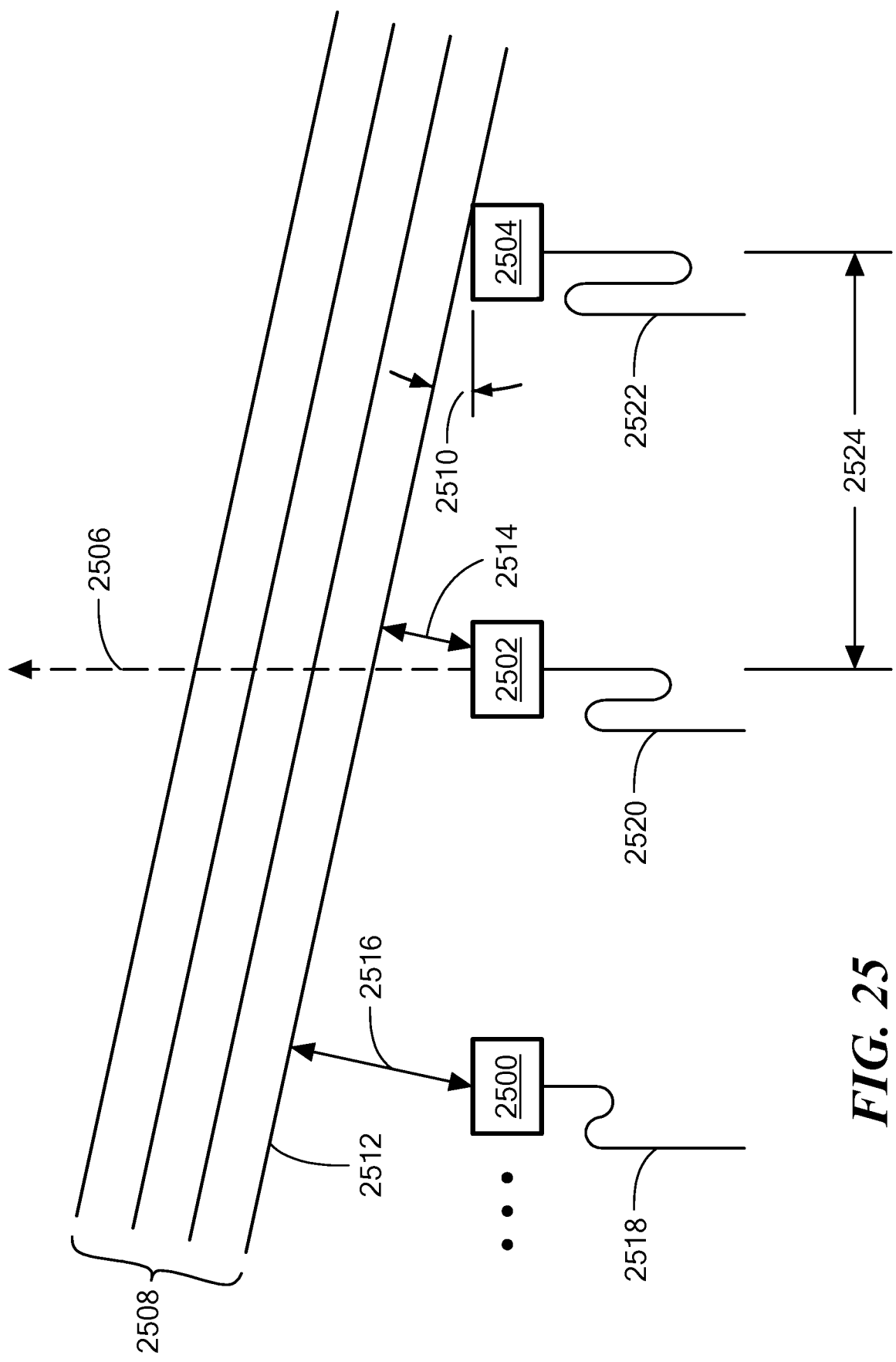
FIG. 25 is a schematic diagram of a portion of a phased array of optical couplers, similar to the phased arrays of optical couplers of FIGS. 1-4, but that has a tilted boresight, according to an embodiment of the present invention.

As noted, some embodiments relax the equality-of-optical-path-lengths requirement in a way that essentially tilts the boresight of the phased array. FIG. 25 is a schematic diagram of three optical couplers 2500, 2502 and 2504 of a phased array. Equal optical length paths would make the phased array maximally sensitive to optical signals arriving along an axis 2506 perpendicular to a plane of the optical couplers 2500-2504.

However, wavefronts 2508 approach the optical couplers 2500-2504 at an angle, not along the axis 2506. The wavefronts 2508 make an angle 2510 with the plane of the optical couplers 2500-2504. The wavefronts 2500-2504 are, therefore, referred to as being "tilted," relative to the optical couplers 2500-2504. As a result of this tilt, wavefront 2512 arrives at optical coupler 2504 before the wavefront 2512 arrives at optical coupler 2502, and the wavefront 2512 arrives at the optical coupler 2502 before the wavefront 2512 arrives at the optical coupler 2500.

Assume the optical coupler 2504 is the first optical coupler of the phased array encountered by the wavefront 2512, and assume additional optical couplers (not shown, but indicated by ellipses) are encountered by the wavefront 2512 later than the wavefront 2512 encounters the optical coupler 2500. After the wavefront 2512 encounters the optical coupler 2504, the wavefront 2512 propagates a distance 2514 before encountering the optical coupler 2502. Similarly, after the wavefront 2512 encounters the optical coupler 2502, the wavefront 2512 propagates a distance 2516 before encountering the optical coupler 2500. Thus, the wavefront 2512 arrives at the optical couplers 2500-2504 not simultaneously, but staggered over time.

To compensate for these staggered arrival times, optical paths for the optical couplers 2500-2504 include different length optical delays 2518, 2520 and 2522. The optical length of the optical delay 2522 is selected to delay an optical signal by an amount of time equal to the difference in arrival times of the wavefront 2512 at the first encountered optical coupler 2504 and the last encountered optical coupler (not shown). Similarly, the optical length of the optical delay 2520 is selected to delay an optical signal by an amount of time equal to the difference in arrival times of the wavefront 2512 at the second encountered optical coupler 2502 and the last encountered optical coupler (not shown). The optical length of the optical delay 2518 is selected to delay an optical signal by an amount of time equal to the difference in arrival times of the wavefront 2512 at the third encountered optical coupler 2500 and the last encountered optical coupler (not shown). Thus, the optical waveguides are configured such that the optical paths include respective incrementally augmented optical paths 2518-2522 in such a manner as to bias constructive phase interference in a predetermined direction of wavefront tilt.

The extra distance 2514 traveled by the wavefront 2512 to reach the optical coupler 2502, after reaching the optical coupler 2504, is B sin Θ, where B is the distance 2524 between the optical couplers 2502 and 2504, and Θ is the angle 2510. (See Mandel L. & Wolf E., "Optical Coherence and Quantum Optics," Cambridge University Press, 1995, Section 4.3.1.) The extra distance traveled by the wavefront 2512 to reach the last optical coupler (not shown), after reaching the first optical coupler 2504, may be similarly calculated. The largest possible value for Θ is 90°. Since sin 90° is 1, the largest extra distance traveled by the wavefront 2512 to reach the last optical coupler (not shown), after reaching the first optical coupler 2504 is the distance between the first and last optical couplers, i.e., the spacing between two maximally spaced-apart optical couplers of the phased array.

Therefore, to encompass an optical phased array with a maximum possible tilt, the criterion on the equality of optical lengths is relaxed by the spacing between the two maximally spaced-apart optical couplers. However, in most practical optical phased arrays, the tilt angle is much less than 90°. It should be noted that some optical couplers perform better with tilted wavefronts than with non-tilted wavefronts. Therefore, the boresight of an optical phased array that includes such optical couplers may be defined to be other than perpendicular to the plane of the optical couplers and, to compensate for the resulting staggered arrival times, optical paths for the optical couplers of the phased array may include different length optical delays, as disclosed herein.

Quad-Cell of Zero-Optical-Path-Length-Difference Phased Arrays

A "quad-cell" is an array of four sensors or emitters, typically arranged in a square. Quad-cells are commonly used to ascertaining a direction from which a signal is received. Each of the four sensors is tuned to maximally respond to signals from slightly different, off-axis directions ([+x, +y], [+x, −y], [−x, −y] and [−x, +y]), where the axis is perpendicular to the entire quad-cell. After detection, the signals from the four detectors may be differenced to calculate a measurement of an arrival angle, relative to the axis.

Figure 8:
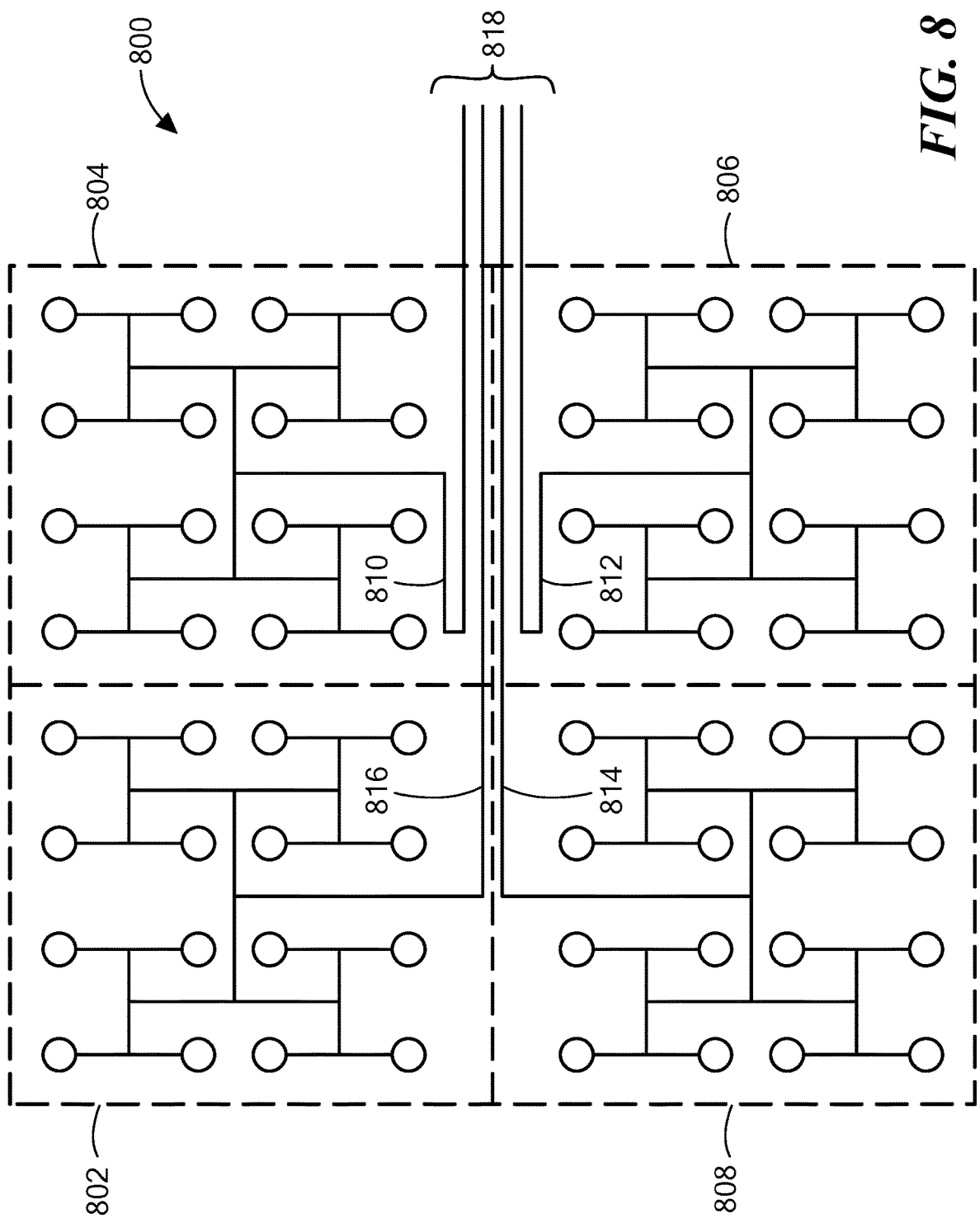
FIG. 8 is a schematic diagram plan view of a quad-cell, in which each cell of the quad-cell includes a zero-optical-path-length-difference phased array of FIGS. 1-7, according to an embodiment of the present invention.

FIG. 8 is a schematic diagram plan view of a quad-cell 800, in which each cell 802, 804, 806 and 808 includes a zero-optical-path-length-difference phased array. Each phased array 802-808 is as described herein, although for simplicity, each phased array 802-808 is shown in FIG. 8 with only 16 optical couplers. The phased arrays 802-808 may have any desired number of optical couplers. The last phased array branches 810 and 812 of cells 804 and 806 may be folded to give them optical path lengths equal to the last phased array branches 814 and 816 of the other two cells 808 and 802.

Figure 9:
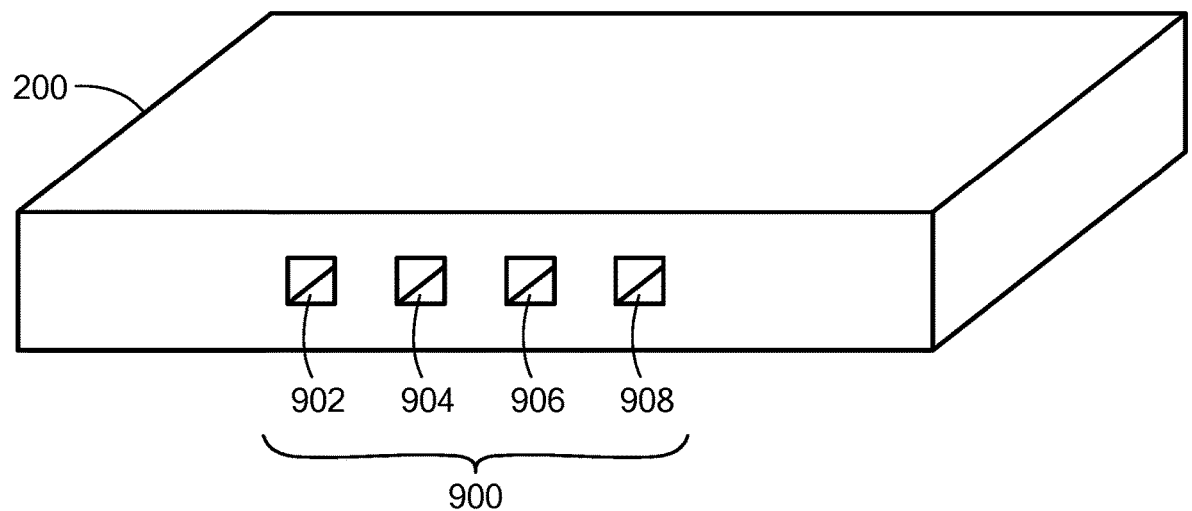
FIG. 9 is a schematic side illustration of a portion of a substrate in which is disposed the quad-cell of FIG. 8, according to an embodiment of the present invention.
Figure 10:
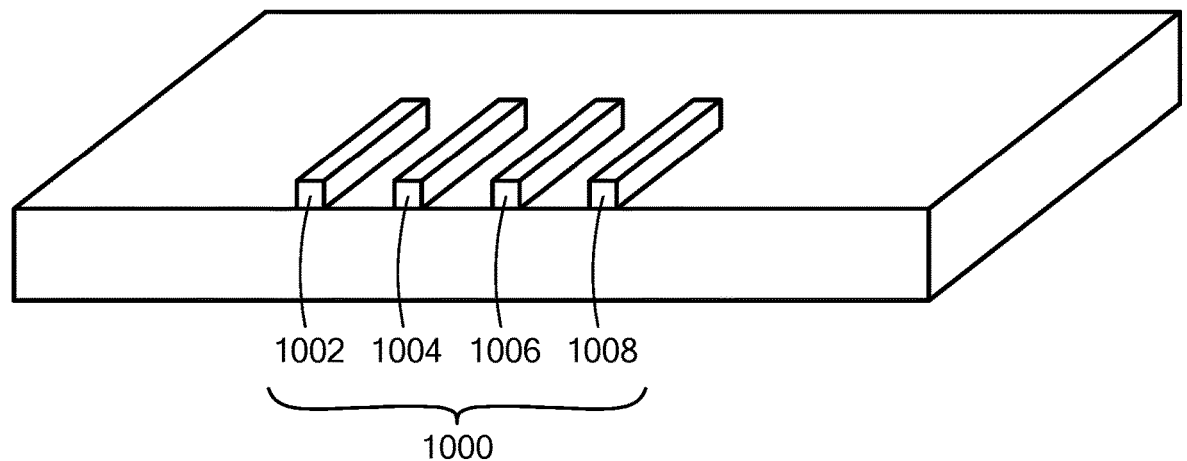
FIG. 10 is a schematic side illustration of a portion of a substrate on which is disposed the quad-cell of FIG. 8, according to an embodiment of the present invention.

Outputs 818 of the four cells 802-808 may terminate at the side of the substrate, as schematically illustrated in FIG. 9. In FIG. 9, outputs 900, corresponding to outputs 818, of the four cells 802-808 terminate at optical ports 902, 904, 906 and 908, respectively. Similarly, as shown schematically in FIG. 10, in embodiments in which the optical waveguides 112-116 are disposed on the surface of the substrate 200, as in FIG. 4, outputs 1000, corresponding to outputs 818, of the four cells 802-808 terminate at optical ports 1002, 1004, 1006 and 1008, respectively. The ports 902-908 are disposed in predefined locations, relative to the substrate 200. The optical waveguides 112-116 (FIG. 1) optically connect the optical couplers 104-110 (FIG. 1) to the ports 902-908 via respective optical paths, one optical path per optical coupler, such that optical lengths of all the optical paths are equal, within a predetermined fraction, less than 1, of the design wavelength.

The outputs 818 of the four cells 802-808 may be processed as in the prior art to ascertain a direction from which a signal is received by the quad-cell. Optionally or alternatively, each cell 802-808 may be electronically steered, such as to maximize signal strength received by the cell, to at least partially ascertain the direction from which the signal is received. In some embodiments, the outputs 818 of the quad-cell 800 are optically connected to respective optical sensors (not shown), and outputs of the optical sensors are connected to a processor (not shown). The processor may execute instructions stored in a memory to perform processes that analyze the outputs of the sensors in a conventional manner to ascertain the direction from which the signal is received.

Although FIG. 8 shows a quad-cell, other numbers of cells may be combined on one substrate 200, thereby providing other numbers of outputs 818.

Figure 11:
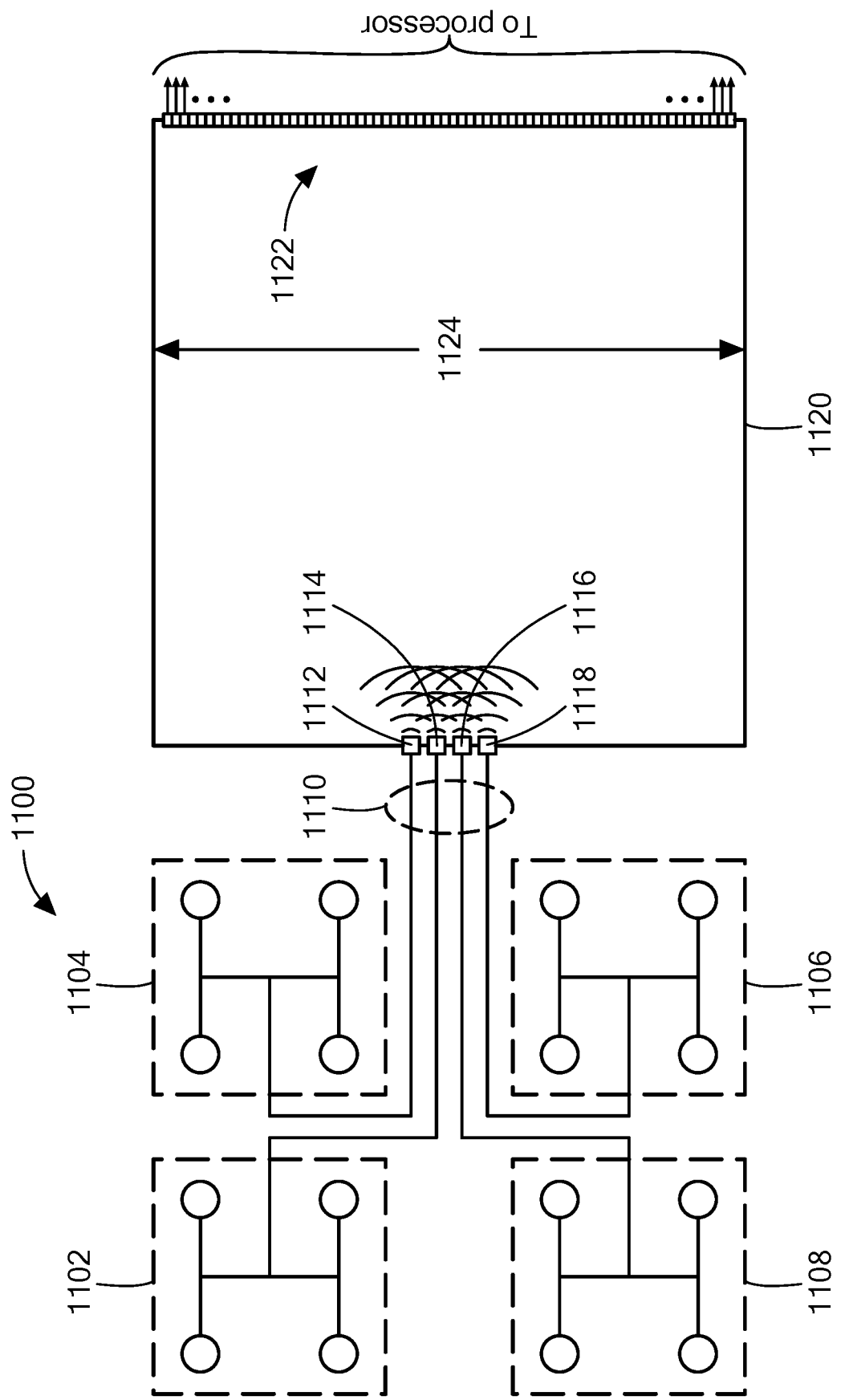
FIG. 11 is a schematic diagram plan view of an interferometer that includes the quad-cell of FIG. 8, according to an embodiment of the present invention.

Interferometer with Quad-Cell of
Zero-Optical-Path-Length-Difference Phased Arrays FIG. 11 is a schematic diagram plan view of an interferometer 1100, according to an embodiment of the present invention. The interferometer 1100 includes four phased arrays 1102, 1104, 1106 and 1108. Each phased array 1102-1108 is as described herein, although for simplicity, each phased array 1102-1108 is shown in FIG. 11 with only four optical couplers. The phased arrays 1102-1108 may have any desired number of optical couplers. Outputs 1110 of the four phased arrays 1102-1108 are optically connected to ports 1112, 1114, 1116 and 1118. The ports 1112-1118 are optical emitters. The ports 1112-1118 may be simply ends of the waveguides 1110, although they may be tapered to better match impedance of a common propagation region 1120.

The ports 1112-1118 emit optical signals, from their respective optical waveguides, into the common propagation region 1120. The common propagation region 1120 should have an area (in plan view) approximately equal to a sum of the areas of the four phased arrays 1102-1108. An array 1122 of optical sensors is disposed on an opposite side of the common propagation region 1122, in the far field of the ports 1112-1118, to receive optical signals from the ports 1112-1118. The optical signals emitted by the ports 1112-1118 interfere with each other in the common propagation region 1120, and the array 1122 of optical sensors detects fringes of an interference pattern created by the interference. The interference pattern has a fringe spatial frequency governed by the spacing of the ports 1112-1118. Here "common" means shared by all the optical signals propagating between the ports 1112-1118 and the array 1122 of optical sensors, so the optical signals are able to interfere with each other. Optionally, the common propagation region 1122 may be lens shaped.

Outputs from the array 1122 of optical sensors may be connected to a processor (not shown). The processor may execute instructions stored in a memory (not shown) to perform processes that analyze the outputs of the optical sensors in a conventional manner, such as using a fast Fourier transform (FFT), to ascertain a direction from which a signal is received by the four phased arrays 1102-1108. Optionally or alternatively, each phased array 1102-1108 may be electronically steered, such as to maximize signal strength received by the cell, to at least partially ascertain the direction from which the signal is received.

Figure 12:
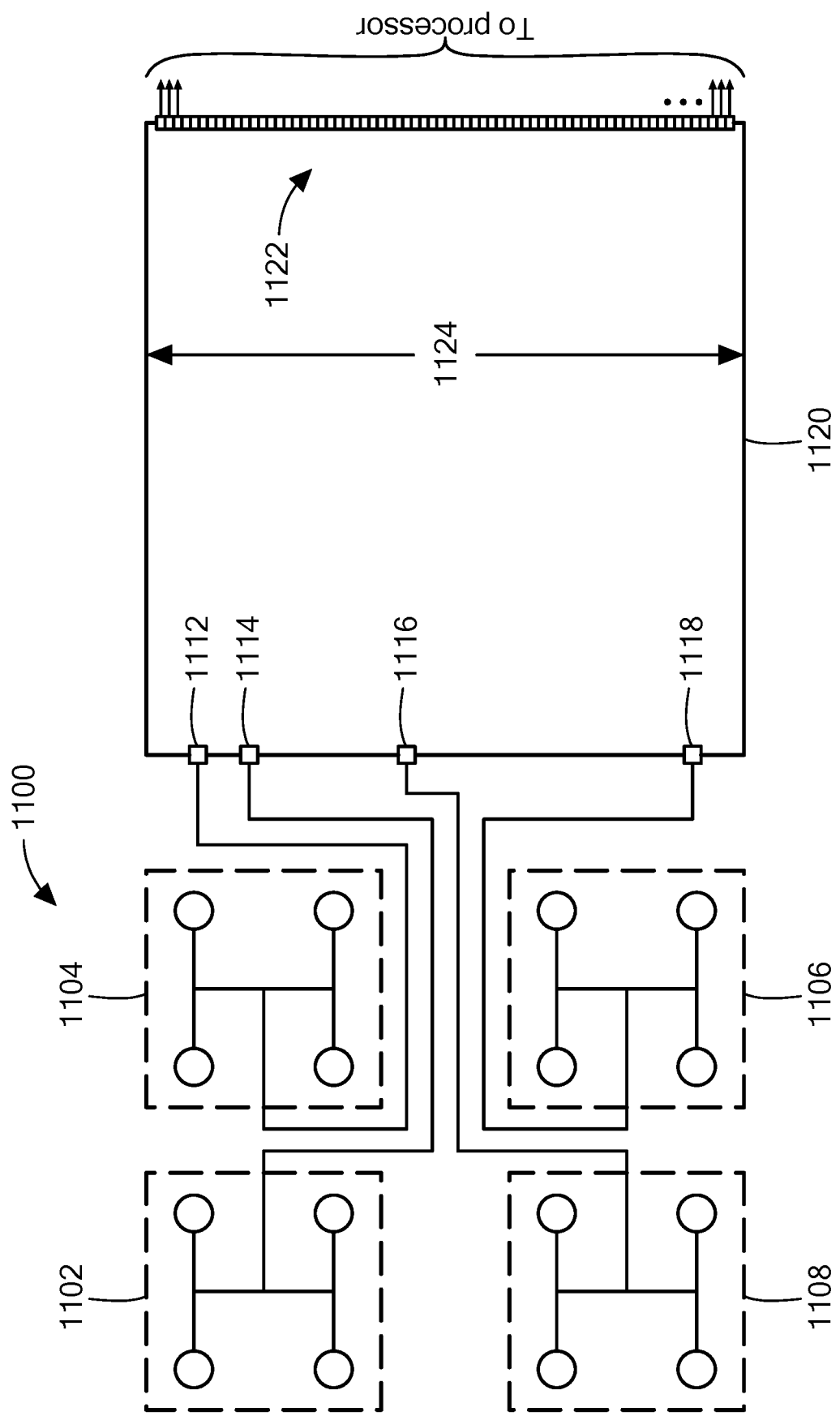
FIG. 12 is a schematic diagram plan view of an interferometer that includes the quad-cell of FIG. 8, according to another embodiment of the present invention.

FIG. 12 is a schematic diagram plan view of an interferometer 1200, similar to the interferometer 1100 of FIG. 11, according to another embodiment of the present invention. In the embodiment shown in FIG. 11, the ports 1112-1118 are sparsely, non-redundantly spaced apart. "Non-redundant spacing" means the vector difference between the locations of any two of the ports 1112-1118 is unique. The outputs of the array 1122 of optical sensors are analyzed in a conventional manner to ascertain a direction from which a signal is received by the four phased arrays 1102-1108.

Figure 13:
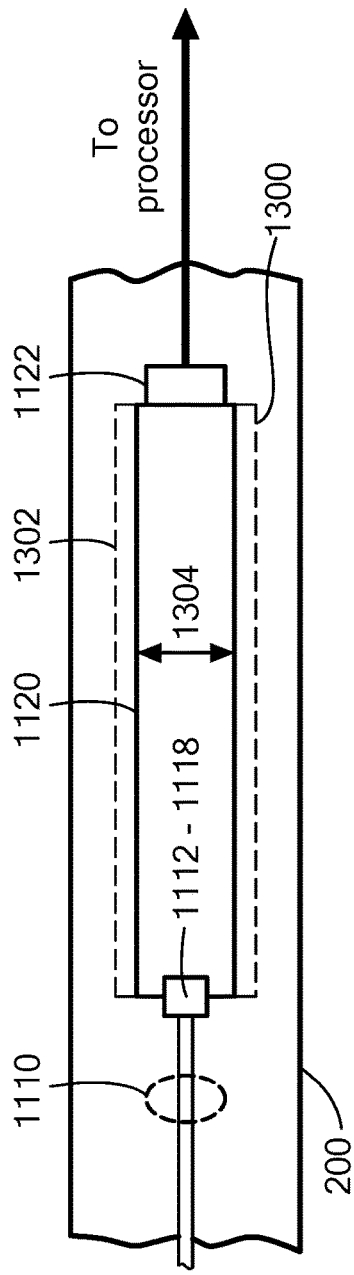
FIG. 13 is a schematic diagram side view of a propagation region of the interferometer of FIG. 11 or 12, according to an embodiment of the present invention.

FIG. 13 is a schematic diagram side view of the propagation region 1120. FIG. 13 is applicable to the embodiments shown in FIGS. 11 and 12. The propagation region 1120 is disposed within the thickness of the substrate 200. The propagation region 1120 may be made of glass or another optical medium, including air, dry nitrogen or a partial vacuum. If the difference in refractive indexes of the substrate 200 and the propagation region 1120 is insufficient to contain the light emitted by the ports 1112-1118, a layer 1300 and 1302 of material with a suitable refractive index may be disposed above and below the propagation region 1120, as shown in dashed line.

Figure 14:
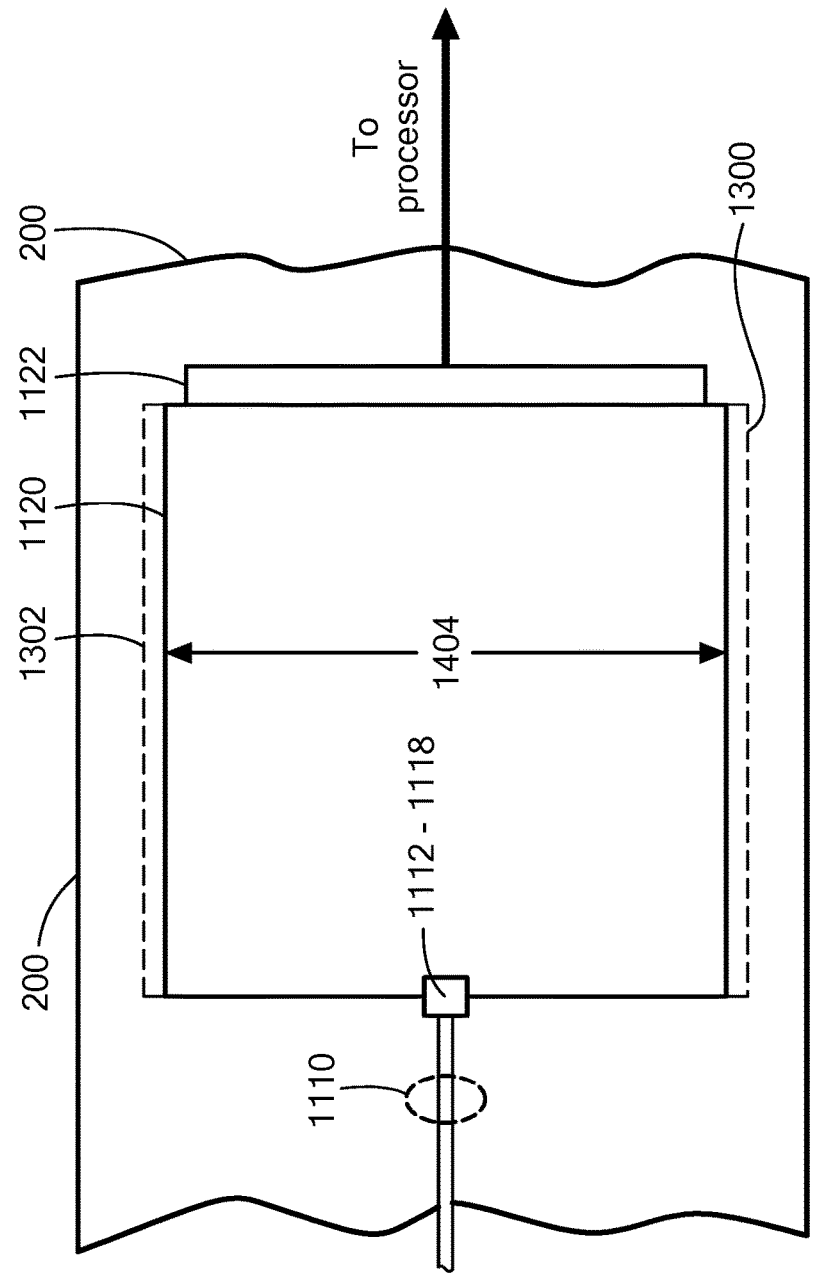
FIG. 14 is a schematic diagram side view of the propagation region of the interferometer of FIG. 11 or 12, according to another embodiment of the present invention.

As shown in FIG. 13, the propagation region 1120 may be relatively thin 1304, almost planar. However, as shown schematically in FIG. 14, the propagation region 1120 can be thick 1404, such as on the order of the width 1124 (FIGS. 11 and 12) of the propagation region 1120. In this case, the array 1122 of optical sensors may be tall, such as up to about the thickness 1404 of the propagation region 1120.

Figure 15:
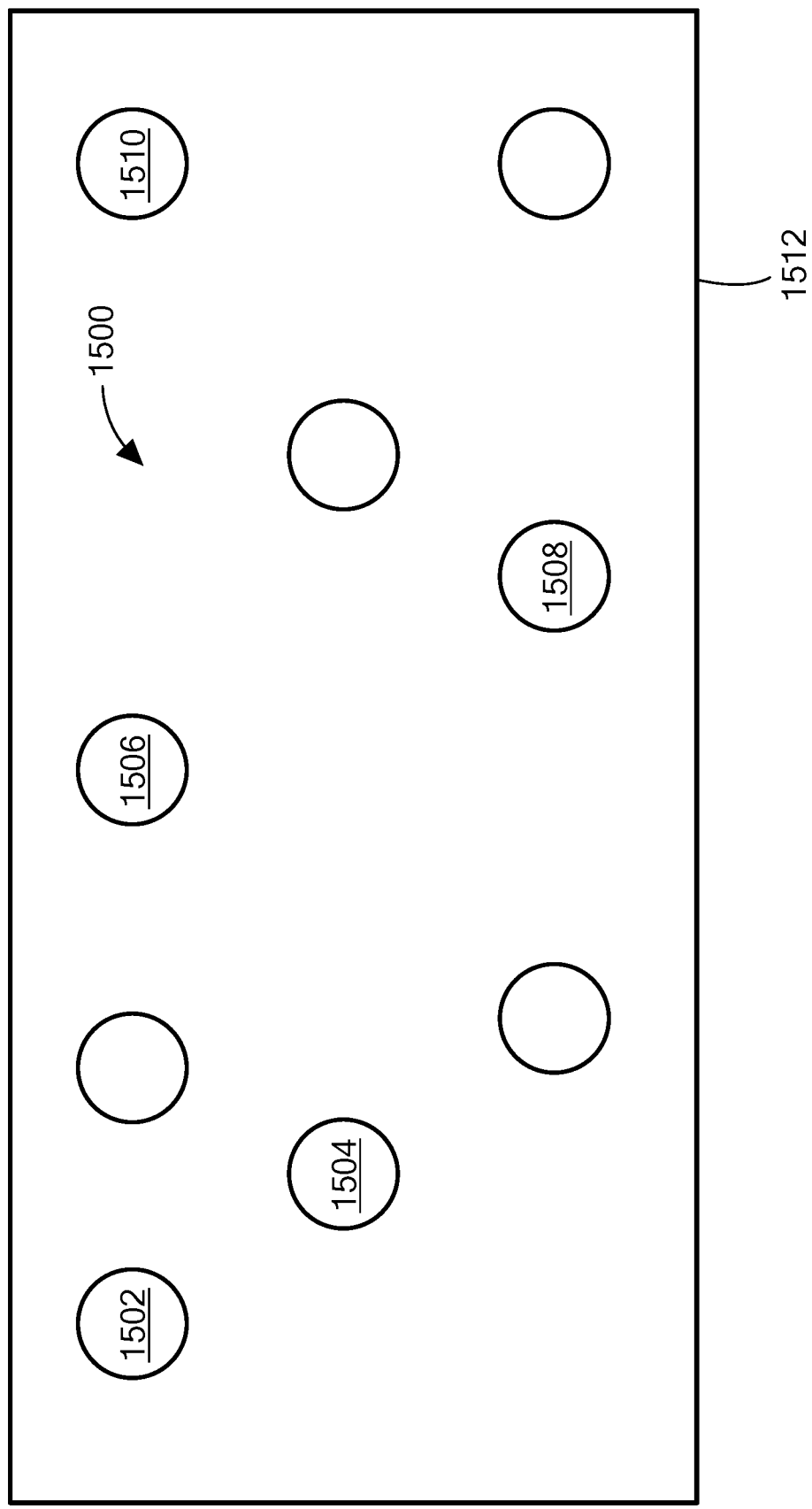
FIG. 15 is a schematic diagram illustrating one possible two-dimensional array of ports disposed on a side of the propagation region of the interferometer of FIG. 11 or 12, according to an embodiment of the present invention.

In some embodiments, particularly if the propagation region is relatively thin 1304, the ports 1112-1118 may be disposed along a line on one side of the propagation region 1120, and the array 1122 of optical sensors may be disposed on the opposite side of the propagation region 1120, along another line parallel to the line of ports 1112-1118. However, alternatively, in any embodiment, the ports 1112-1118 may be disposed in a two-dimensional array on one side of the propagation region 1120. FIG. 15 is a schematic diagram illustrating one possible two-dimensional array 1500 of ports, represented by ports 1502, 1504, 1506, 1508 and 1510, disposed on a side 1512 of the propagation region 1120. Other numbers of ports 1502-1510, and other arrangements of the ports 1502-1510 are contemplated.

Similarly, the array 1122 of optical sensors need not be arranged along a line. The optical sensors may be arranged in a two-dimensional array, for example a two-dimensional array similar to the array 1500 shown in FIG. 15. In this case, a second FFT may be used to analyze the outputs of the array 1122 of optical sensors to ascertain a direction from which a signal is received by the four phased arrays 1102-1108.

The interferometers 1100 and 1200 of FIGS. 11-15 may each be fabricated on a single wafer, or the phased arrays 1102-1108 may be fabricated on one wafer and the propagation region 1120, along with the ports 1112-1118 and array 1122 of optical sensors, may be fabricated on a separate wafer, and the two wafers may be bonded together. In either case, the interferometers 1100 and 1200 are essentially planar. However, in other embodiments, the propagation region 1120 may be optically folded under the phased arrays 1102-1108 (including the optical waveguides of the phased arrays), as schematically illustrated in FIG. 16 or 17, to form a more compact interferometer.

Figure 16:
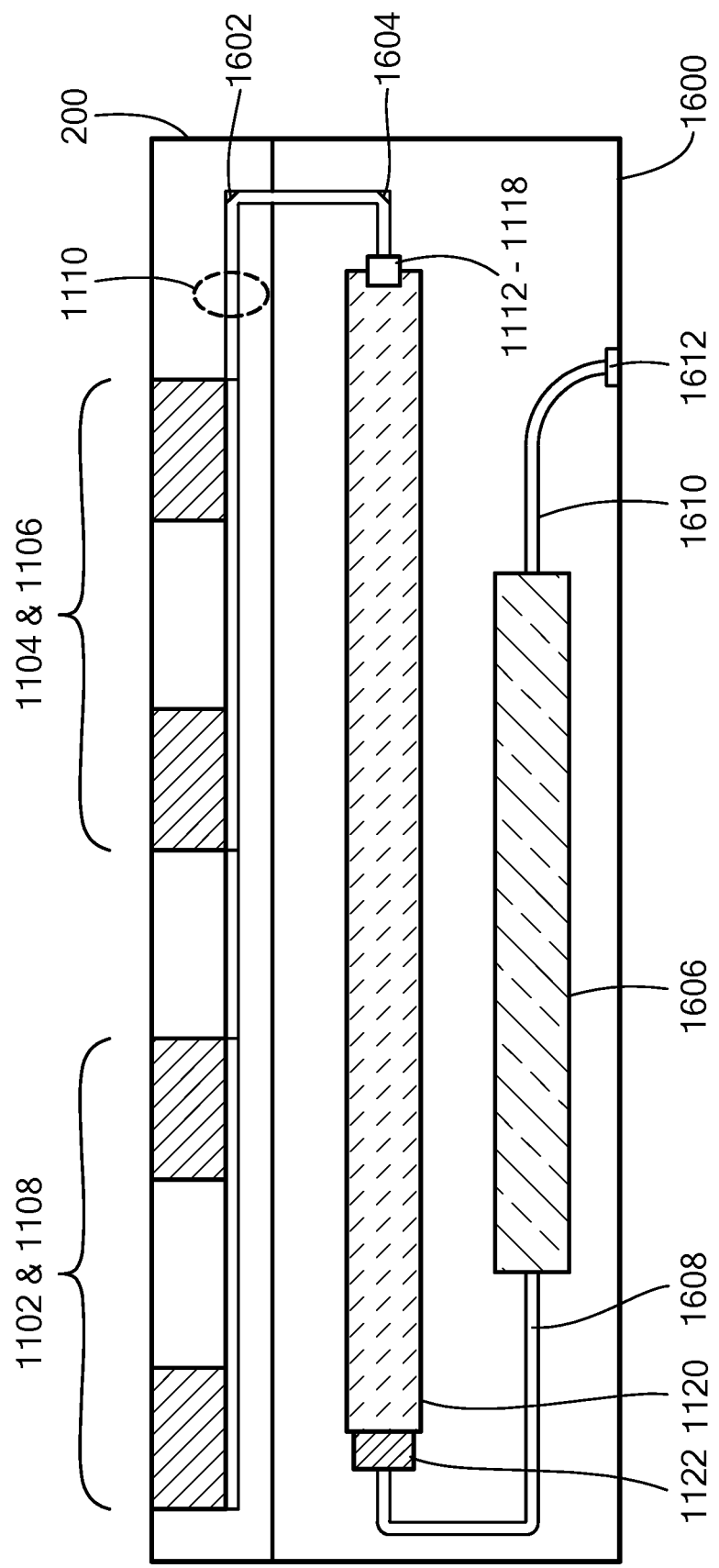
FIG. 16 is a schematic cross-sectional view of a folded interferometer that includes the quad-cell of FIG. 8, according to an embodiment of the present invention.

In FIG. 16, the propagation region 1120 is disposed in a second wafer 1600 that may be bonded to the substrate 200. The outputs 1110 of the phased arrays 1102-1108 are folded, such as by mirrors or prisms disposed at 1602 and 1604, into the second wafer 1600 and into the ports 1112-1118. In another embodiment (not shown), the propagation region 1120 is fabricated in another layer of the substrate 200, instead of in a separate wafer. The common optical propagation region and the plurality of optical transducers are disposed in a second layer of the substrate, parallel to, and optionally spaced apart from, the first layer, such that the common optical propagation region is optically folded under the first, second, third and fourth pluralities of optical waveguides.

Optionally, a processor and memory 1606 may be fabricated in or on the substrate 200 or in the second wafer 1600 and electrically connected via signal leads 1608 to the array 1122 of optical sensors. An output 1610 of the processor 1606 may be connected to a set of electrical contact pads 1612, to which an external circuit may be electrically connected. After processing signals from the array 1122 of optical sensors, the processor 1606 may send electrical signals via the output 1610 and the set of electrical contact pads 1612 to the external circuit, such as to indicate a direction from which the signal is received by the phased arrays 1102-1108. Similarly, the processor 1606 may receive command signals via the electrical contact pads 1612 and, in response, steer one or more of the phased arrays 1102-1108, such as by controlling the heaters 708 and 710 discussed with respect to FIG. 7.

Figure 17:
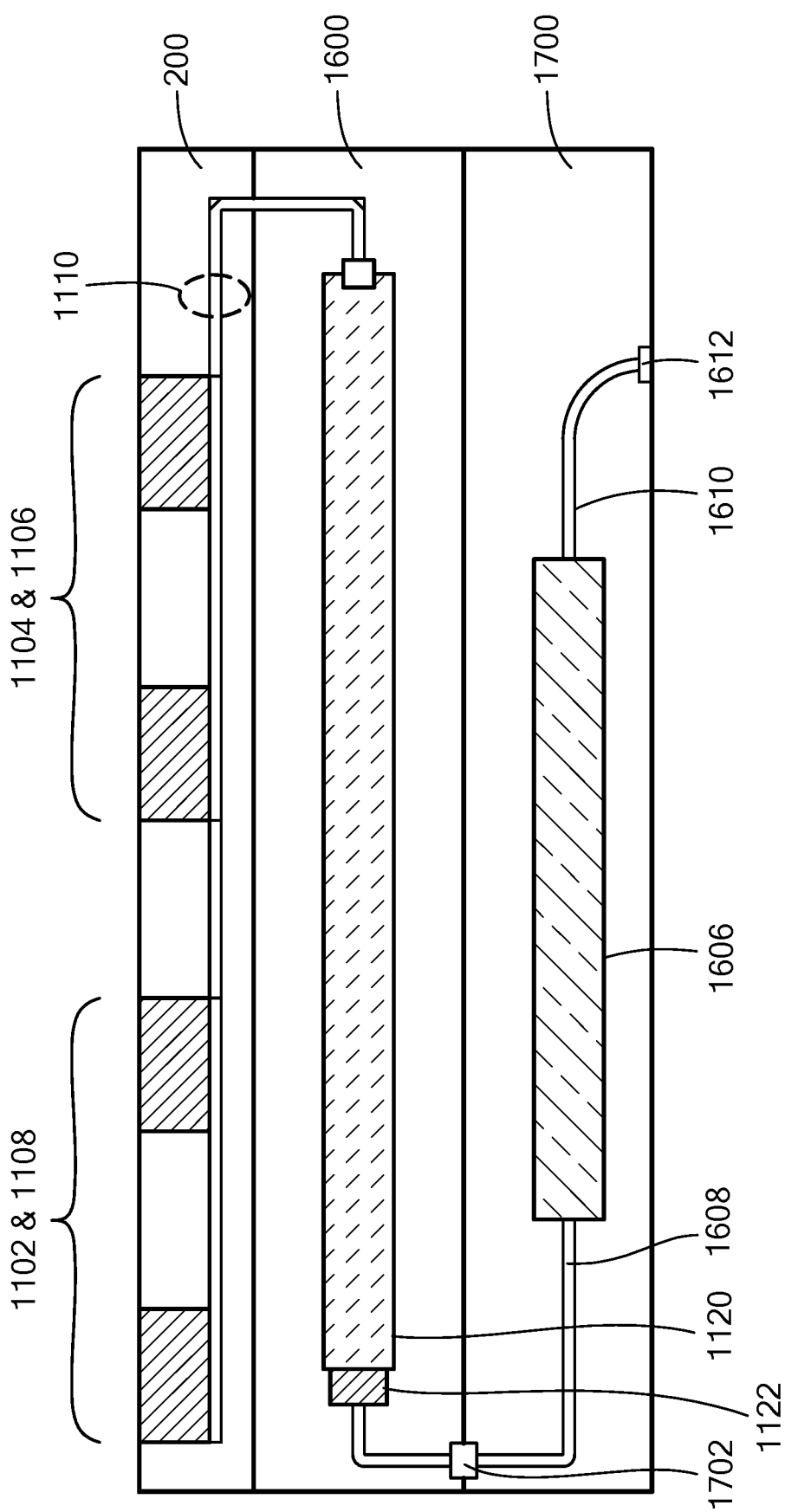
FIG. 17 is a schematic cross-sectional view of a folded interferometer that includes the quad-cell of FIG. 8, according to another embodiment of the present invention.

Alternatively, as shown in FIG. 17, the processor and memory 1606 may be fabricated in a third wafer 1700, and the second and third wafers 1600 and 1700 may be bonded together. A suitable electrical connection 1702 between the two wafers 1600 and 1700 electrically connects the array 1122 of optical sensors to the processor 1606.

Figure 18:
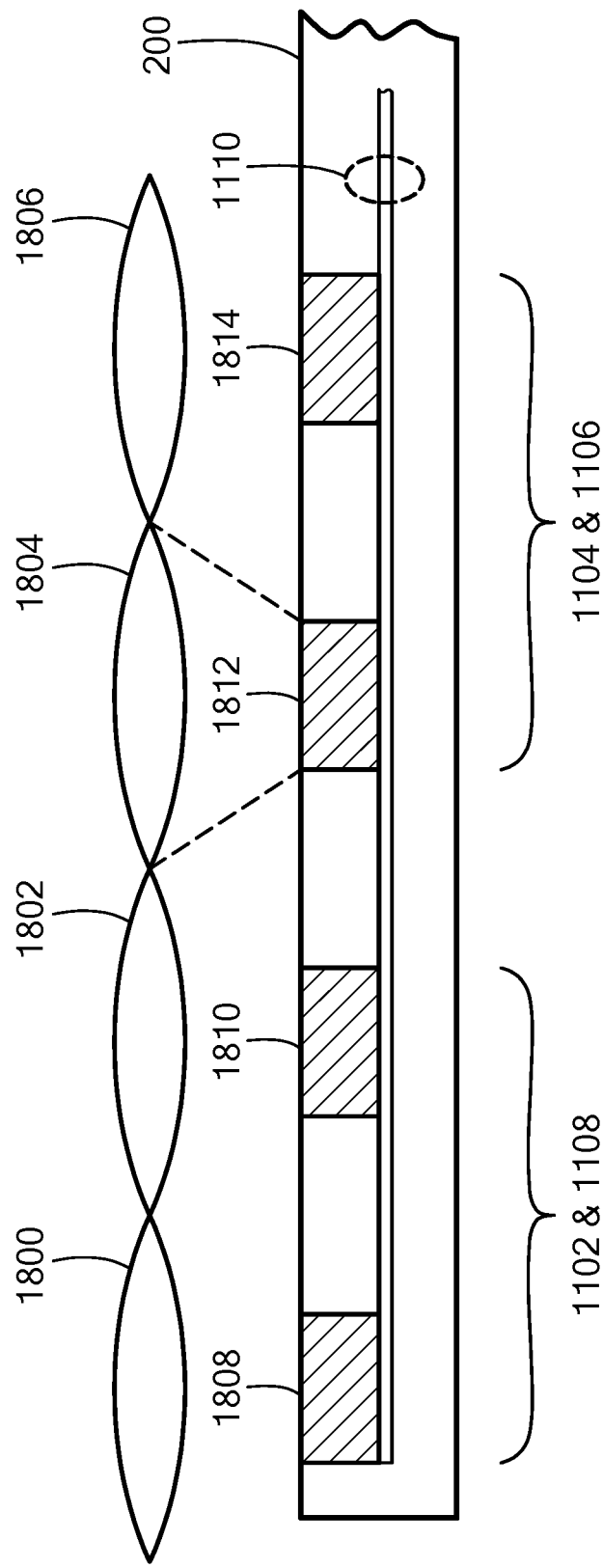
FIG. 18 is a schematic diagram side view of the substrate of FIGS. 2-4 with microlenses disposed above the optical couplers, according to an embodiment of the present invention.

Any embodiment may optionally have microlenses disposed proximate its optical couplers. FIG. 18 is a schematic diagram side view of the substrate 200 with a microlens, exemplified by microlenses 1800, 1802, 1804 and 1806, disposed above each optical coupler 1808, 1810, 1812 and 1814. Each microlens 1800-1806 may be larger in diameter than its corresponding optical coupler 1808-1814, thereby capturing more light than the optical couplers 1808-1814 would capture absent the microlenses. Furthermore, the microlenses 1800-1806 reduce the angular field-of-view the optical couplers 1808-1814 would otherwise have, thereby eliminating some side lobes from the radiation pattern of the phased array.

Multi-Stage Beam Steering

Figure 19:
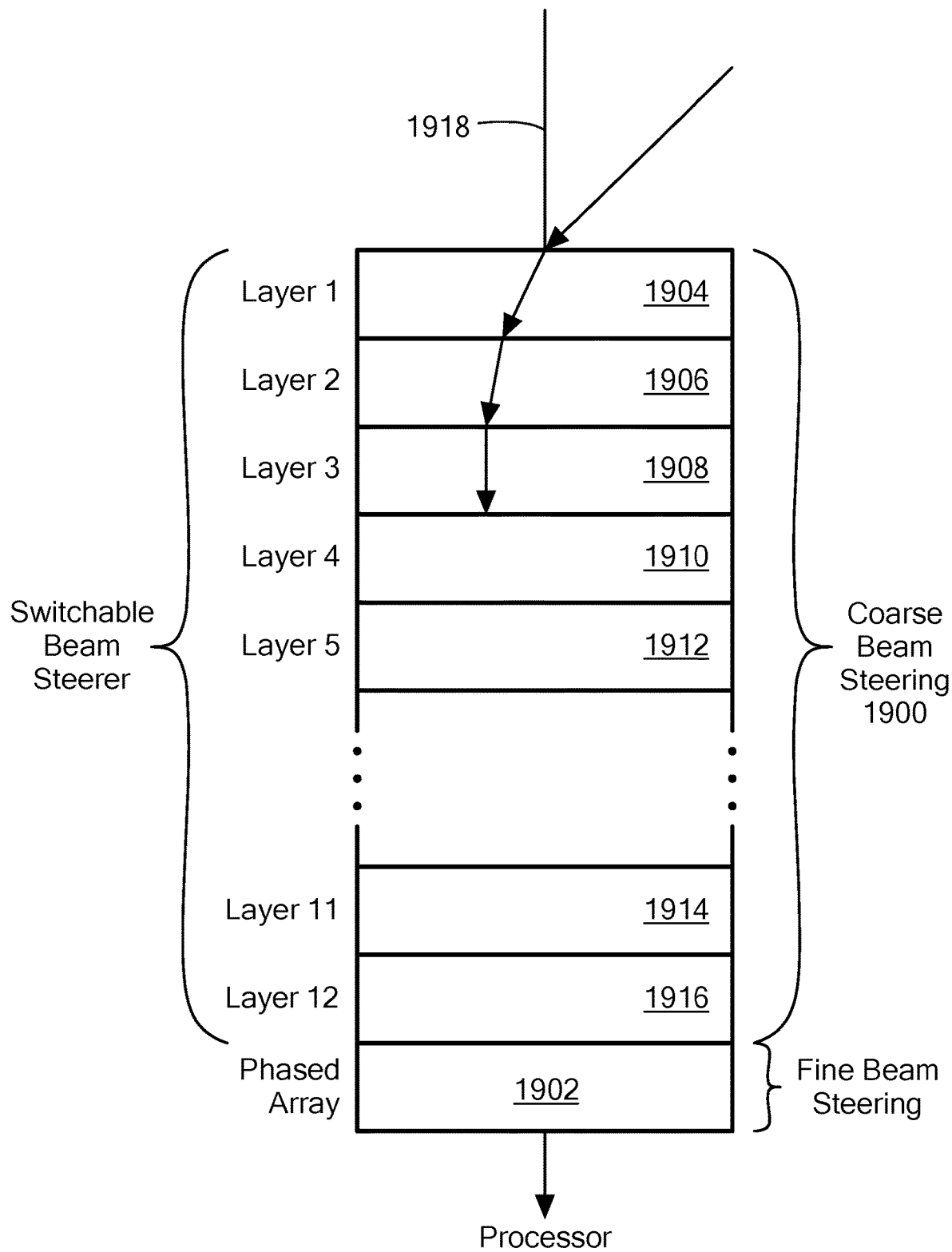
FIG. 19 is a schematic diagram side view of a coarse beam steerer disposed optically in front of one or more phased arrays, according to an embodiment of the present invention.

Optical phased arrays, as described herein, may have limited ranges over which they can be steered, and in some cases, these ranges may be insufficient. In such cases, a coarse beam steerer may be disposed optically in front of one or more phased arrays. FIG. 19 is a schematic diagram side view of such an arrangement. A coarse beam steerer 1900 is disposed optically in front of a phased array 1902. The phased array 1902 acts as a fine beam steerer. The coarse beam steerer 1900 is capable of selectively changing the look direction of the system over a greater range than the phased array 1902.

In an embodiment, the coarse beam steerer 1900 includes twelve stacked layers, exemplified by layers 1904, 1906, 1908, 1910, 1912, 1914 and 1916. Each layer 1904-1916 is selectively switchable between two modes. In the first mode, the layer has a first refractive index, and in the second mode, the layer has a second refractive index. In the first mode, the layer does not bend a light beam incident on the layer, but in the second mode, the layer bends the light a fixed angle. Each layer is oriented within the stack such that, in its first mode the layer, the layer does not refract light entering the layer, but in its second mode, the layer refracts light from a vertical axis 1918.

The material, thickness, orientation and/or construction of the layers are such that the fixed (second mode) angles of the layers increase progressively from layer to layer, such as in a binary fashion. For example, the refraction angles of the layers may be as indicated in Table 1.

TABLE 1

| Layer | First Mode Refraction Angle | Second Mode Refraction Angle |
|---|---|---|
| 1 | 0° | 34.130° |
| 2 | 0° | 17.065° |
| . | 0° | . |
| . | . | . |
| . | . | . |
| 10 | 0° | 0.0333° (120 arcsec) |
| 11 | 0° | 0.0167° (60 arcsec) |
| 12 | 0° | 0.0083° (30 arcsec) |

Thus, depending on the combination of layers that are set to their respective first modes, any angle between about 0° and about 34.14° may be selected, in 30 arcsec steps.

Each layer may include a birefringent prism, such as a nicol prism, and a suitable electrically switchable filter, such as a polarization selector, that selects one of the two beams (polarizations) emanating from the birefringent prism.

Figure 20:
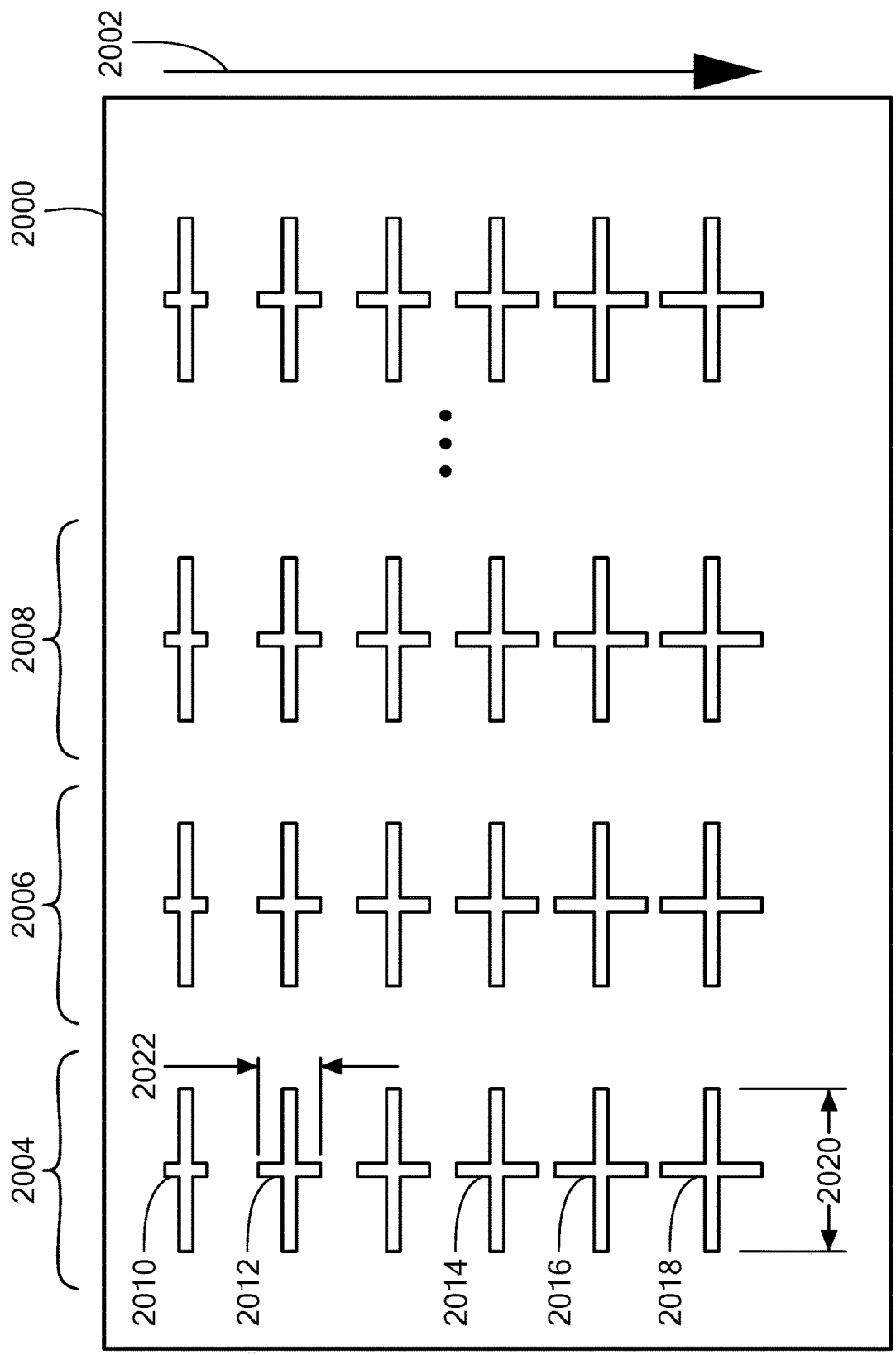
FIG. 20 is a schematic diagram illustrating a set of switchable optical nanoantennas that may be used as a layer in the coarse beam steerer of FIG. 19, according to an embodiment of the present invention.

In another embodiment, each layer includes a set of switchable optical nanoantennas. One such layer 2000 is schematically illustrated in FIG. 20. A direction of propagation of light through the thickness of the layer is indicated by an arrow 2002. The layer 2000 includes many columns of switchable optical nanoantennas, exemplified by columns 2004, 2006 and 2008. Each column 2004-2008 includes many switchable optical nanoantennas; however for simplicity of explanation, only six switchable optical nanoantennas, exemplified by switchable optical nanoantennas 2010, 2012, 2014, 2016 and 2018, are shown in each column 2004-2008. The nanoantennas 2010-2018 may be made of a metamaterial, such as by patterned metal on a silicon chip using conventional nanolithography. The nanoantennas 2012 and 2018 near and at ends of the column 2004 of nanoantennas are schematically illustrated in FIG. 21.

Each nanoantenna 2010-2018 may be in the shape of a cross or another suitable shape. In the cross embodiment, an electrical dimension 2020 of one element of the nanoantenna is equal for all the nanoantennas 2010-2018. However, an electrical dimension 2022 of another element of the nanoantenna varies monotonically down each column of nanoantennas 2010-2018. Such a layer 2000 of nanoantennas delays one linear polarization of incident light, with respect to the other linear polarization.

The nanoantennas 2010-2018 are switchable between two modes. In one mode, the electrical dimension 2022 varies monotonically down each column of nanoantennas 2010-2018, as described. However, in the other mode, the electrical dimension 2022 is equal in all of the nanoantennas 2010-2018. In this mode, the set of nanoantennas 2010-2018 does not delay one linear polarization of incident light, with respect to the other linear polarization.

Each nanoantenna 2010-2018 can be made switchable between the two modes by two field effect transistors (FETs) or other suitable electronic switches in the nanoantenna element whose length varies across the set of nanoantennas. The FETs may be fabricated of indium tin oxide (ITO), a transparent electrical conductor. As schematically illustrated in FIG. 21, the nanoantenna 2012 includes two sub-elements 2100 and 2102 that can be selectively electrically connected to the rest of the nanoantenna 2012 by FETs 2104 and 2106, respectively, or electrically isolated from the rest of the nanoantenna 2012 by the FETs 2104 and 2106.

Applying an appropriate bias voltage to the FETs 2104 and 2106 causes the FETs to turn "on" and electrically connect the sub-elements 2100 and 2102 to the nanoantenna 2012, thereby effectively making the electrical dimension 2022 (FIG. 20) of the nanoantenna equal to a length indicated at 2108. However, removing the bias voltage from the FETs 2104 and 2106 turns the FETs "off," electrically isolating the sub-elements 2100 and 2102 from the nanoantenna 2012, thereby effectively making the electrical dimension 2022 (FIG. 20) of the nanoantenna equal to a length indicated at 2110.

Similarly, the nanoantenna 2018 includes two sub-elements 2112 and 2114 that can be selectively electrically connected, or not, to the rest of the nanoantenna by two FETs 2116 and 2118, respectively. The FETs 2104, 2106, 2116 and 2118 are positioned, relative to the rest of the nanoantennas 2012 and 2018, such that distances 2110 and 2120 are equal to each other and equal to the dimension 2022 of the nanoantenna 2010. Therefore, when the FETs 2104, 2106, 2116 and 2118 are "off," all the nanoantennas 2010-2018 have equal electrical dimensions 2022, and the nanoantennas 2010-2018 do not delay one linear polarization of incident light, with respect to the other linear polarization. However, when the FETs 2104, 2106, 2116 and 2118 are "on," the electrical dimensions 2022 of the nanoantennas 2010-2018 vary monotonically down each column of nanoantennas 2010-2018, and the nanoantennas do delay one linear polarization of incident light, with respect to the other linear polarization. The FETs 2104, 2106, 2116 and 2118 may be controlled by a processor (not shown).

Zero-Optical-Path-Length-Difference Phased Array Signal Processing

Figure 22:
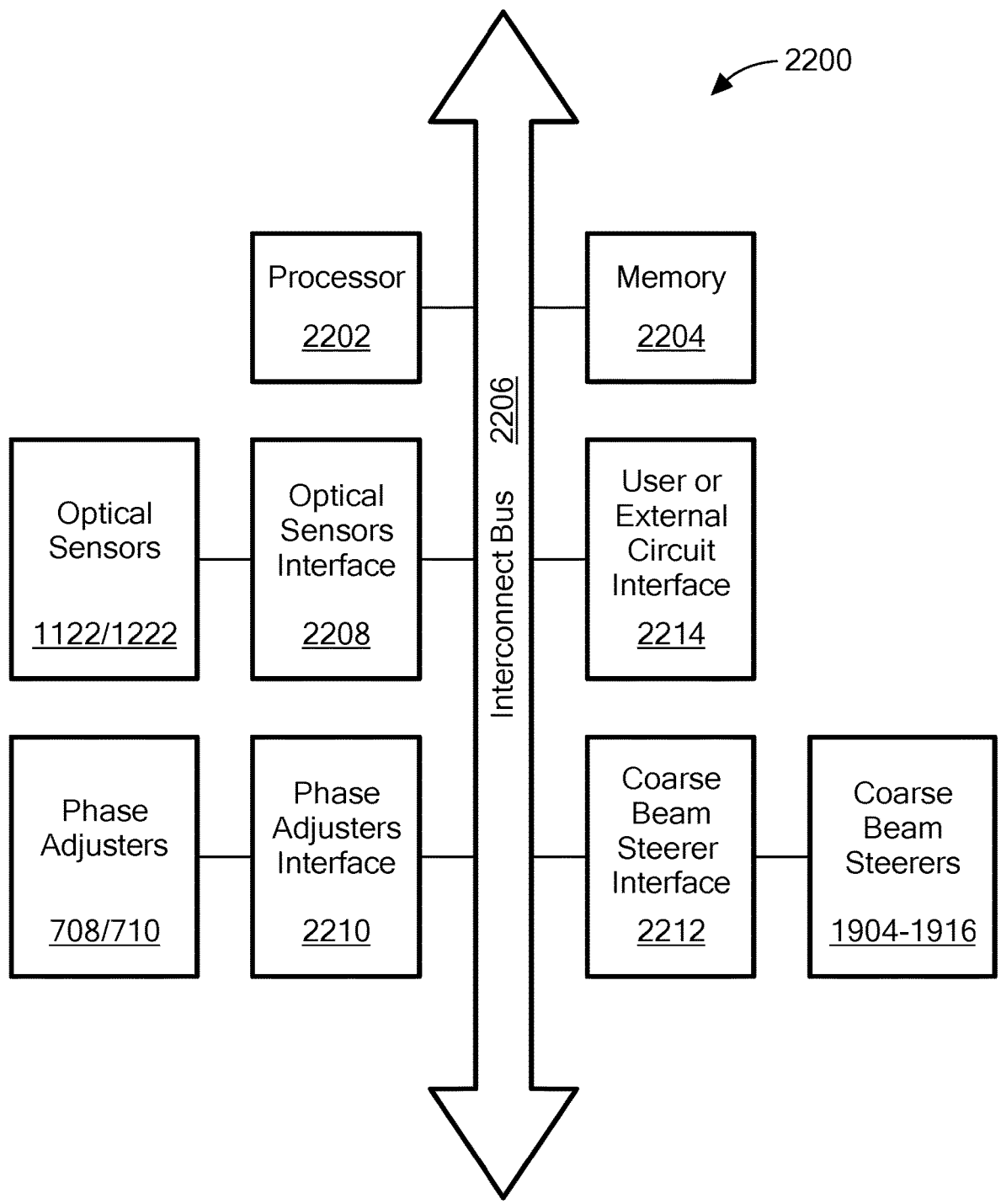
FIG. 22 is a schematic block diagram of a computer that processes signals from optical sensors of the phased arrays or interferometers of FIGS. 1-17, according to an embodiment of the present invention.

As noted, signals from optical sensors may be processed by a processor to ascertain a direction from which an optical signal originates. FIG. 22 is a schematic block diagram of a computer 2200 that processes the signals from the optical sensors. All or parts of the computer 2200 may be implemented on the same substrate 200 as the phased array and/or the same substrate as the optical sensors, such as substrate 1600. Optionally or alternatively, the computer 2200 may be implemented on a separate substrate that is bonded and electrically connected to the substrate 200 or 1600.

The computer 2200 includes a processor 2202 that executes instructions stored in a memory 2204. The processor 2202 may be a single-core or multi-core microprocessor, microcontroller or other suitable processor. The processor 2202 and memory 2204 may be interconnected by an interconnect bus 2206. The interconnect bus 2206 delivers instructions from the memory 2204 to the processor 22002, and the interconnect bus 2206 delivers data from the processor 2202 to be stored by the memory 2204. The interconnect bus 2206 also interconnects other components of the computer, as shown and described herein.

The optical sensors 1122, or optical sensors directly optically coupled to outputs 818 of one or more phased arrays, may be electrically connected to the interconnect bus 2206 by a suitable peripheral interface circuit 2208. Such a circuit 2208 may include suitable amplifiers, analog-to-digital converters (ADCs), level converters, buffers, etc. for converting signals, such as voltages, generated by the optical sensors into digital signals suitable for providing to the processor 2202.

Similarly, the heaters 708 and 710 in the dynamically tunable optical delay lines may be electrically connected to a phase adjusters peripheral interface circuit 2210. The interface circuit 2210 may include suitable digital-to-analog converters (DACs), amplifiers, level converters, etc. for converting digital signals from the processor 2202 to voltages and/or currents suitable for driving the heaters 708 and 710.

Similarly, the coarse beam steerers 1904-1916 may be electrically connected to a coarse beam steerer peripheral interface circuit 2212. The interface 2212 may include suitable digital-to-analog (DACs), amplifiers, level converters, etc. for converting digital signals from the processor 2202 to voltages and/or currents suitable for driving the coarse beam steerers 1904-1916, such as by turning the FETs 2104, 2106, 2116 and 2118 on or off.

A user interface or external circuit interface 2214 enables a user to enter parameters of operation and/or read directions from which optical signals originate and/or an external circuit to do so.

Thus, the processor 2202 is connected to the optical sensors, and the processor 2202 receives signals indicative of intensity of light received by each optical sensor. The processor 2202 executes processes that analyze the signals to calculate an axis, relative to the substrate 200, of propagation of incoherent light from a far field of the optical phased array.

Determining a Direction to an Incoherent Optical Source

Apparatus described herein may be used to determine a direction to an incoherent optical source, according to several methods, including the following non-exhaustive list. A single optical phased array, such as the phased array described with reference to FIGS. 1-7, may be electronically steered, such as by a processor, to ascertain a direction of maximum signal reception. Signals from an n-cell of three or more symmetrically arranged optical phased arrays, exemplified by the quad-cell described with reference to FIGS. 8-10, may be processed, such as by a processor, to ascertain a direction, in two dimensions (for example, x and y, or azimuth and elevation), to an incoherent optical source. If ascertaining a direction in only one dimension (for example, elevation only, for a given azimuth) is sufficient, an n-cell with two or more symmetrically arranged optical phased arrays may be used. Optionally, the signals from the n-cell may be fed through a common propagation region described with reference to FIGS. 11-17, and resulting interference fringes may be analyzed by a processor to ascertain a direction to an incoherent optical source. Optionally, the optical phased arrays of the n-cell may be electronically steered, such as by the processor, to ascertain a direction of maximum signal reception. Any of these methods may deploy microlenses optically before the optical couplers of the optical phased array(s), as described with reference to FIG. 18. Any of these methods may deploy a coarse beam steerer, as described with reference to FIGS. 19-21, optically before each optical phased array and control the coarse beam steerer by the processor. Any of these methods may mechanically steer any of the apparatus described herein, such as by a gimbal controlled by a processor, to ascertain a direction of maximum signal reception.

Figure 23A:
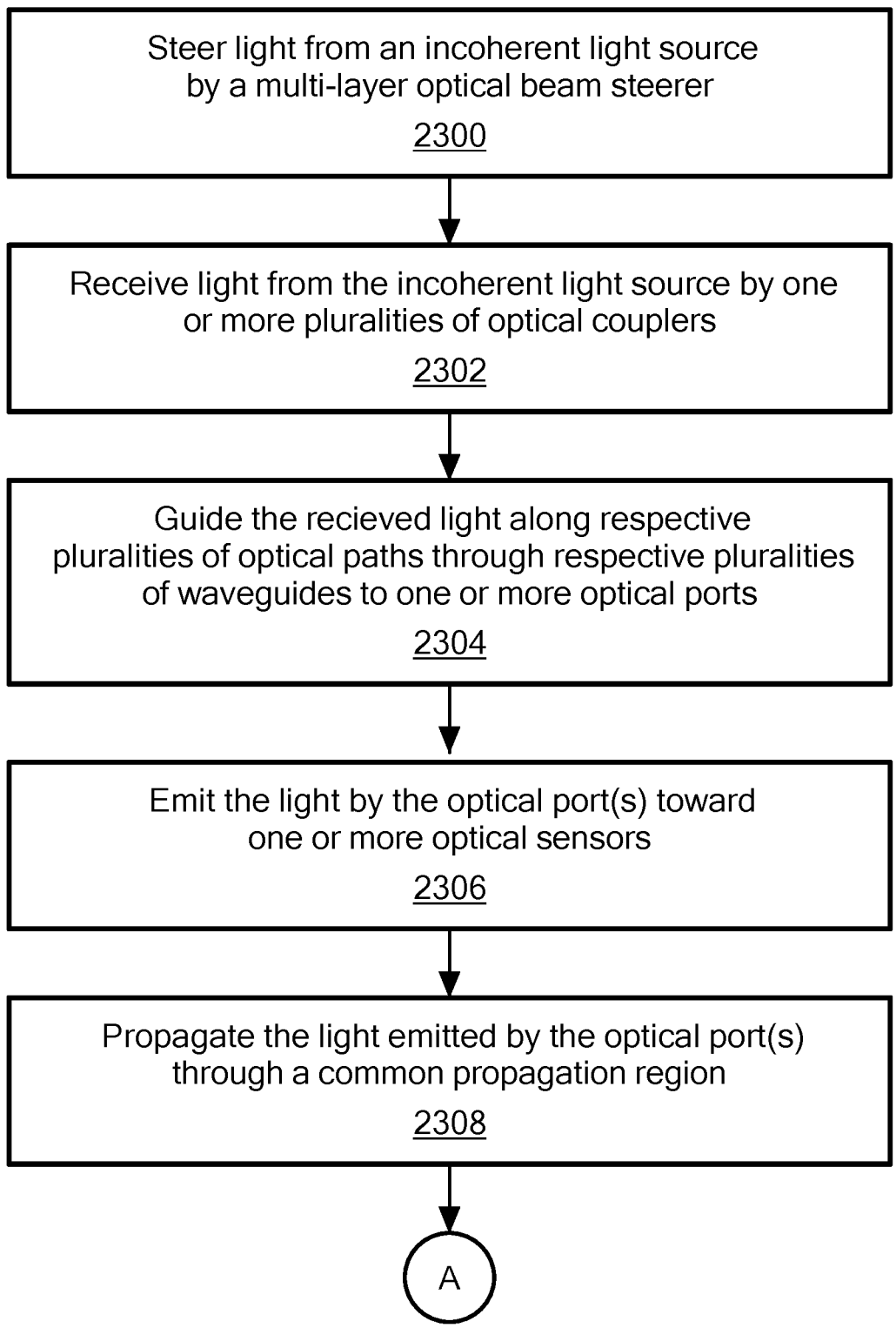
FIGS. 23A and 23B collectively are a flowchart schematically illustrating operations performed by the computer of FIG. 22, according to an embodiment of the present invention.
Figure 23B:
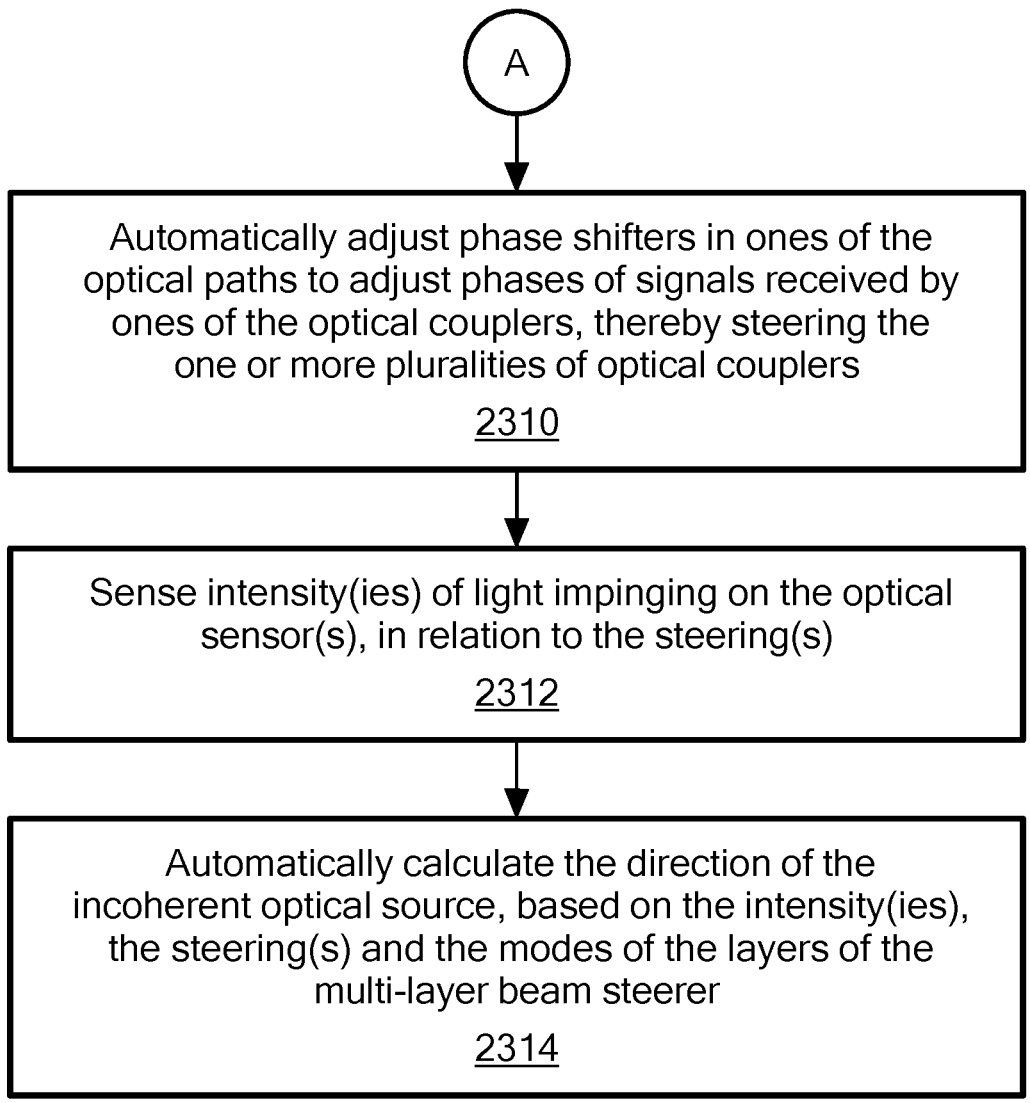

FIG. 23 is a flowchart schematically illustrating operations that may be performed to ascertain a direction to an incoherent optical source, according to an embodiment of the present invention. At 2300, light from an incoherent optical source, such as a star, is optionally steered by a multi-layer optical beam steerer, such as the coarse beam steerer, described with reference to FIGS. 19-21. At 2302, the light from the incoherent optical source is received by one or more arrays of optical couplers, such as the arrays described with reference to FIGS. 1 and 24.

At 2304, the light received by the optical couplers is guided along respective sets of optical paths, through respective sets of optical waveguides, to one or more optical ports. The light is guided such that optical lengths of all the optical paths are equal, within a predefined criterion. In one embodiment, the criterion is one coherence length at a bandwidth greater than about 0.1% plus a spacing between two maximally spaced-apart optical couplers of the first plurality of optical couplers, as discussed with respect to FIG. 25. In another embodiment, the criterion is a one coherence length at a bandwidth greater than about 0.1%. In another embodiment, the criterion is a predetermined fraction, less than 1, of the design wavelength. Exemplary optical waveguides and optical paths are described with reference to FIGS. 2-4 and 8-10.

At 2306, the light is emitted by the optical port(s) toward one or more optical sensors, as described with respect to FIGS. 11, 12 and 15. At 2308, the emitted light is propagated through a common propagation region, as described with respect to FIGS. 11-14, 16 and 17.

At 2310, phase shifters in ones of the optical paths are automatically adjusted to steer the array(s) of optical couplers, as described with respect to FIGS. 5-7, to steer the array(s) of optical sensors. At 2312, the intensity(ies) of the light impinging on the optical sensor(s) is(are) sensed, in relation to the steering(s) of the optical coupler array(s). At 2314, the direction of the incoherent optical source is automatically calculated, based on the intensity(ies) of the light, the steering(s) of the optical coupler array(s) and the modes of the layers of the multi-layer beam steerer, as discussed with respect to FIG. 22.

Optical Projector

According to the reciprocity theorem, a phased array of optical couplers can be used to transmit optical signals preferentially in a desired direction. Thus, any of the phased arrays of optical couplers described herein may be used as optical projectors. For example, a light source 520 (FIG. 5), under control of the computer 2200 of FIG. 22, may emit light 522 into the root port of a phased optical array 100. The computer 2200 may dynamically control the dynamically tunable optical delay lines 512-518 to dynamically change the far-field radiation pattern of the phased optical array, thereby "painting" the far-field with light.

Unless otherwise indicated or would be otherwise understood by one of ordinary skill in the art, "about" means within twenty percent. While specific parameter values may be recited for disclosed embodiments, within the scope of the invention, the values of all of parameters may vary over wide ranges to suit different applications. While the invention is described through the above-described exemplary embodiments, modifications to, and variations of, the illustrated embodiments may be made without departing from the inventive concepts disclosed herein. Furthermore, disclosed aspects, or portions thereof, may be combined in ways not listed above and/or not explicitly claimed. Accordingly, the invention should not be viewed as being limited to the disclosed embodiments.

Although aspects of embodiments may be described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof. Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable non-transitory storage media (e.g., read-only memory devices within a computer, such as ROM, or devices readable by a computer I/O attachment, such as CD-ROM or DVD disks), information alterably stored on tangible writable non-transitory storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

What is claimed is:

1. A method for ascertaining a direction to an incoherent optical source, the method comprising:
    receiving light from the incoherent optical source by a first plurality of optical couplers;
    guiding the light received by the first plurality of optical couplers along a first plurality of optical paths through a first plurality of optical waveguides to a first optical port, one optical path per optical coupler, such that optical lengths of all the first plurality of optical paths are equal, within one coherence length at a bandwidth greater than about 0.1% plus a spacing between two maximally spaced-apart optical couplers of the first plurality of optical couplers;
    emitting the light by the first optical port toward an optical sensor;
    automatically adjusting a first plurality of dynamically tunable optical delay lines, each dynamically tunable optical delay line of the first plurality of dynamically tunable optical delay lines being disposed in a respective optical path of the first plurality of optical paths, thereby steering sensitivity of the first plurality optical couplers to the light;
    sensing intensity of the light by the first optical sensor, in relation to the steering; and
    automatically calculating the direction to the incoherent optical source, based on the intensity of the light and the steering.

2. A method as defined by claim 1, further comprising:
    receiving light from the incoherent optical source by second and third pluralities of optical couplers;
    guiding the light received by the second and third pluralities of optical couplers along respective second and third pluralities of optical paths through respective second and third pluralities of optical waveguides to respective second and third optical ports, one optical path per optical coupler, such that optical lengths of all the first, second and third pluralities of optical paths are equal, within one coherence length at a bandwidth greater than about 0.1% plus a spacing between two maximally spaced-apart optical couplers of the first, second and third plurality of optical couplers;

emitting the light by the second and third optical ports toward the optical sensor, wherein emitting the light by the first, second and third optical ports comprises emitting the light into a common optical propagation region and the optical sensor comprises an array of optical sensors;

automatically adjusting second and third pluralities of dynamically tunable optical delay lines, each dynamically tunable optical delay line of the second and third pluralities of dynamically tunable optical delay lines being disposed in a respective plurality of optical paths, thereby steering sensitivities of the second and third pluralities of optical couplers to the light; and propagating the light from the first, second and third optical ports through the common optical propagation region to the array of optical sensors;

sensing respective intensities of the light by the array of optical sensors, in relation to the respective steerings; and wherein:

automatically calculating the direction to the incoherent optical source comprises automatically calculating the direction to the incoherent optical source, based on the respective intensities of the light and the respective steerings.

3. A method as defined by claim 2, further comprising:

steering the light from the incoherent optical source, prior to the light impinging on the first, second and third pluralities of optical couplers, by an optical beam steerer comprising a plurality of layers, wherein:
  each layer of the optical beam steerer has, in a first mode, a respective first refractive index and, in a second mode, a respective second refractive index different from the layer's first refractive index at a design wavelength;
  each layer's second refractive index is different from each other layer's second refractive index at the design wavelength;
  each layer of the optical beam steerer is independently electrically switchable between the layer's first refractive index and the layer's second refractive index; and
  automatically calculating the direction to the incoherent optical source comprises automatically calculating the direction to the incoherent optical source, based on the respective intensities of the light, the respective steerings and respective modes of the layers.

* * * * *